(12) United States Patent
Bugenhagen et al.

(10) Patent No.: US 11,122,132 B2
(45) Date of Patent: *Sep. 14, 2021

(54) APPLICATION PROGRAMMING INTERFACE (API) TO PROVIDE NETWORK METRICS AND NETWORK RESOURCE CONTROL TO USERS

(71) Applicant: CenturyLink Intellectual Property LLC, Broomfield, CO (US)

(72) Inventors: Michael K. Bugenhagen, Leawood, KS (US); Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,148

(22) Filed: Aug. 26, 2020

(65) Prior Publication Data

US 2020/0389533 A1  Dec. 10, 2020

Related U.S. Application Data

(63) Continuation of application No. 16/573,879, filed on Sep. 17, 2019, now Pat. No. 10,764,377, which is a
(Continued)

(51) Int. Cl.
*G06F 15/173* (2006.01)
*H04L 29/08* (2006.01)
(Continued)

(52) U.S. Cl.
CPC ............ *H04L 67/16* (2013.01); *H04L 41/046* (2013.01); *H04L 41/083* (2013.01);
(Continued)

(58) Field of Classification Search
None
See application file for complete search history.

(56) References Cited

U.S. PATENT DOCUMENTS 9,569,232 B1  2/2017  Brandwine
9,813,300 B2  11/2017  Yu
(Continued)

OTHER PUBLICATIONS

"Broadband Access Service Attributes and Performance Metrics", Issue 1 Feb. 2015, 51 pgs.

*Primary Examiner* — Quang N Nguyen

(57) ABSTRACT

Novel tools and techniques are provided for implementing network application programming interface ("API"), and, more particularly, API to provide network metrics and network resource control to users. In some embodiments, a computing system might receive customer network telemetry data from a first network via a gateway API, might receive service provider network telemetry data from a second network(s) via a network API, might compile the customer network telemetry data and the service provider network telemetry data, might receive a request from a user to access information regarding network services associated with the user, might filter the compiled customer network telemetry data and the compiled service provider network telemetry data to isolate first telemetry data and second telemetry data, respectively, might provide the user with access to at least one of the first telemetry data or the second telemetry data, and might provide the user with options to control network resources.

19 Claims, 24 Drawing Sheets

Related U.S. Application Data continuation of application No. 15/793,515, filed on Oct. 25, 2017, now Pat. No. 10,425,491.

(60) Provisional application No. 62/482,021, filed on Apr. 5, 2017, provisional application No. 62/452,133, filed on Jan. 30, 2017.

(51) Int. Cl.

| | | |
|---|---|---|
| *H04Q 9/02* | (2006.01) | |
| *H04L 12/24* | (2006.01) | |
| *H04L 12/927* | (2013.01) | |
| *H04M 15/00* | (2006.01) | |
| *H04Q 3/00* | (2006.01) | |
| *H04Q 9/00* | (2006.01) | |
| *H04W 4/24* | (2018.01) | |
| *H04L 12/26* | (2006.01) | |
| *H04W 88/16* | (2009.01) | |

(52) U.S. Cl.
CPC ...... *H04L 41/0816* (2013.01); *H04L 41/0823* (2013.01); *H04L 41/0853* (2013.01); *H04L 41/14* (2013.01); *H04L 41/18* (2013.01); *H04L 41/20* (2013.01); *H04L 41/22* (2013.01); *H04L 41/5032* (2013.01); *H04L 43/04* (2013.01); *H04L 43/10* (2013.01); *H04L 43/14* (2013.01); *H04L 47/803* (2013.01); *H04L 67/10* (2013.01); *H04L 67/20* (2013.01); *H04L 67/2804* (2013.01); *H04M 15/70* (2013.01); *H04M 15/72* (2013.01); *H04M 15/846* (2013.01); *H04Q 3/0087* (2013.01); *H04Q 9/00* (2013.01); *H04Q 9/02* (2013.01); *H04W 4/24* (2013.01); *H04L 41/0876* (2013.01); *H04L 41/5096* (2013.01); *H04W 88/16* (2013.01)

(56) References Cited

U.S. PATENT DOCUMENTS

| | | | |
|---|---|---|---|
| 10,523,631 B1 | 12/2019 | Wagner | |
| 10,541,893 B2 * | 1/2020 | Nainar | H04L 43/026 |
| 10,621,055 B2 | 4/2020 | Donlan | |
| 2004/0151161 A1 | 8/2004 | Casey et al. | |
| 2004/0177163 A1 | 9/2004 | Casey et al. | |
| 2005/0157856 A1 * | 7/2005 | Humphries | H04L 12/66 379/88.17 |
| 2009/0064255 A1 | 3/2009 | Jiang | |
| 2010/0268575 A1 | 10/2010 | McCauley | |
| 2013/0282897 A1 | 10/2013 | Siegel et al. | |
| 2014/0105038 A1 | 4/2014 | Yu | |
| 2018/0122111 A1 * | 5/2018 | Silva | H04W 4/08 |
| 2018/0219749 A1 | 8/2018 | Bugenhagen et al. | |
| 2019/0058656 A1 | 2/2019 | Gundersen et al. | |
| 2020/0257566 A1 * | 8/2020 | Ganguli | G06F 1/20 |
| 2020/0344252 A1 * | 10/2020 | Menon | G06F 16/906 |
| 2021/0117249 A1 * | 4/2021 | Doshi | G06F 9/522 |
| 2021/0126847 A1 * | 4/2021 | Thiel | H04L 43/0894 |
| 2021/0144517 A1 * | 5/2021 | Guim Bernat | G06F 11/3006 |
| 2021/0200864 A1 * | 7/2021 | Rudnik | H04L 63/20 |

* cited by examiner

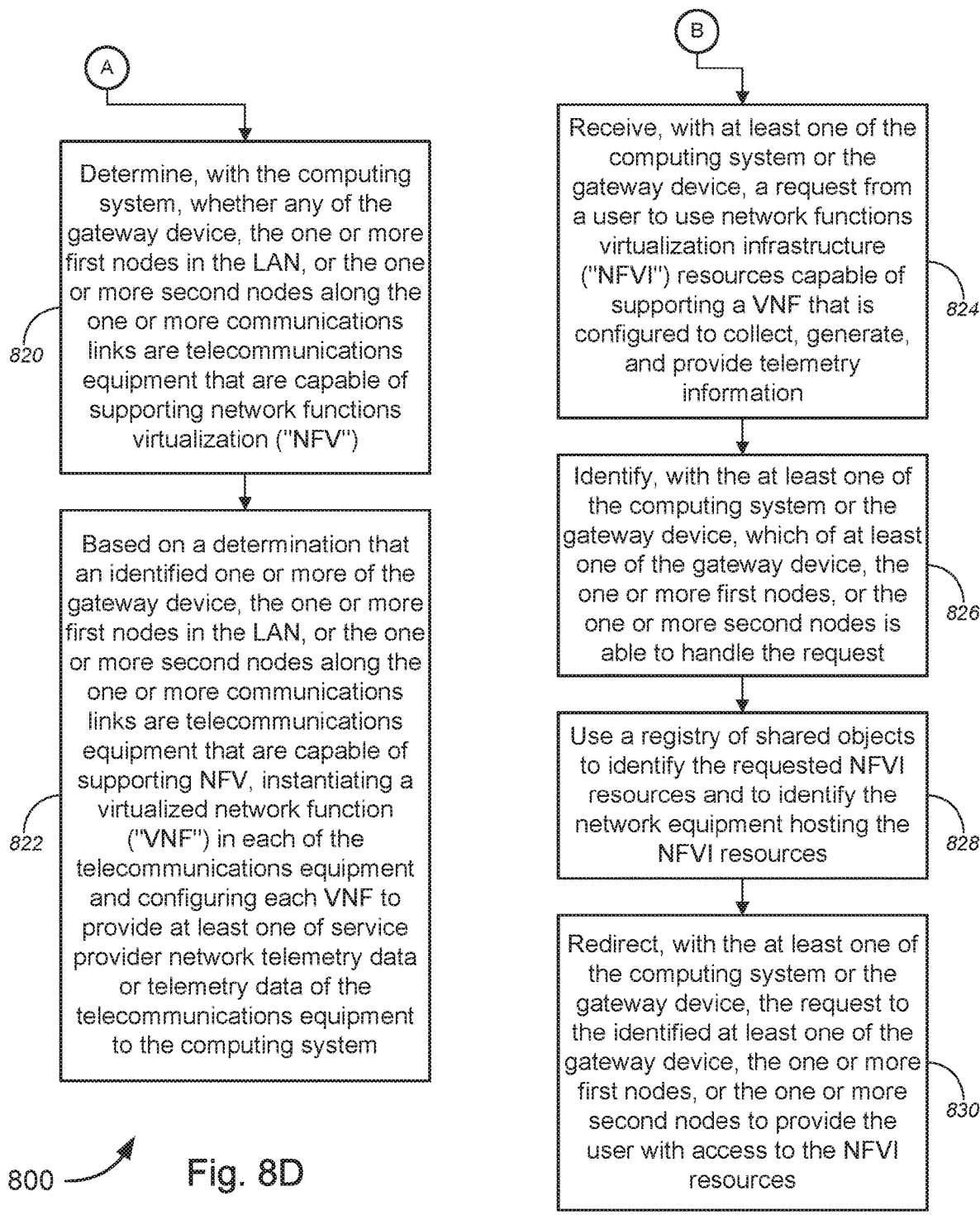

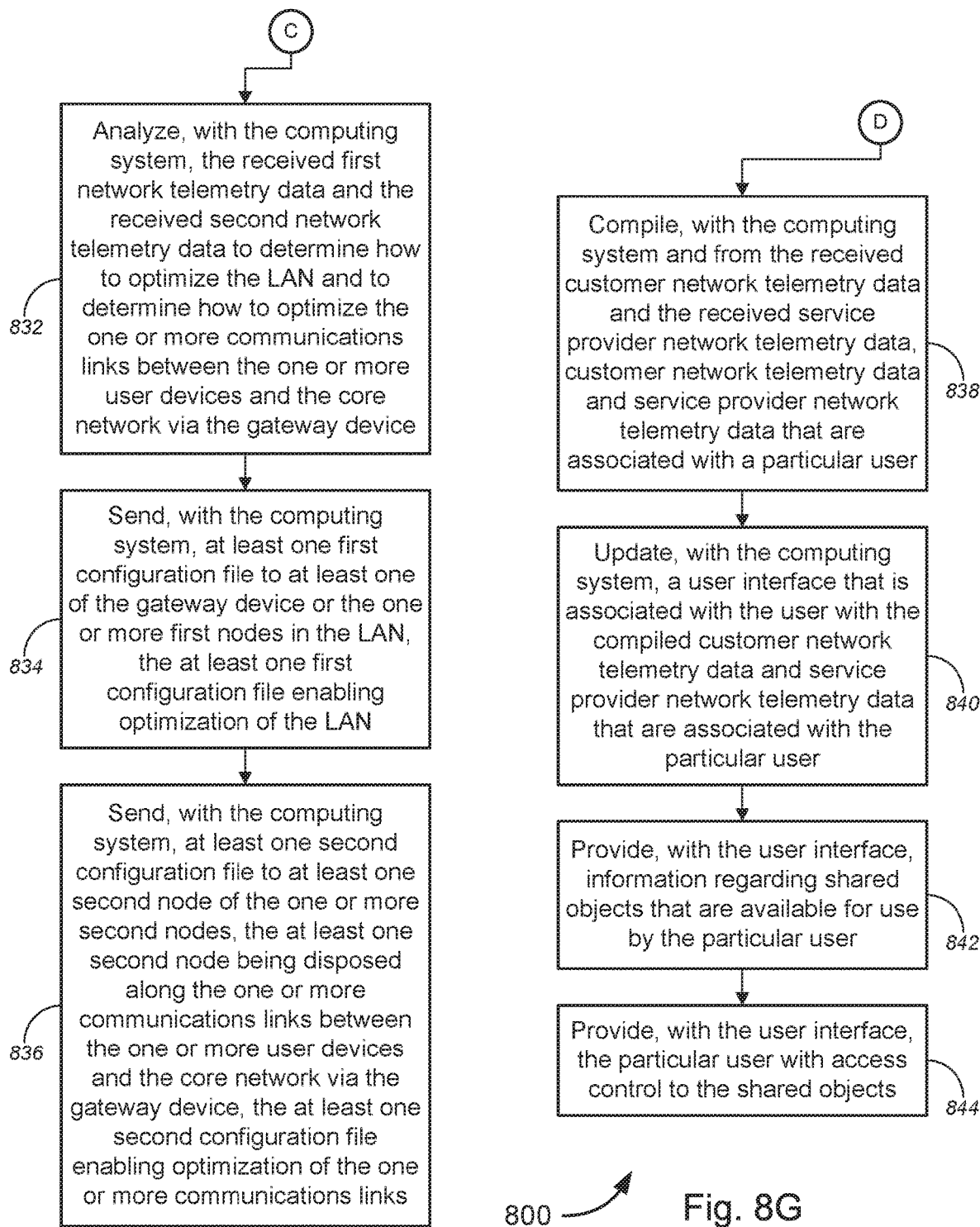

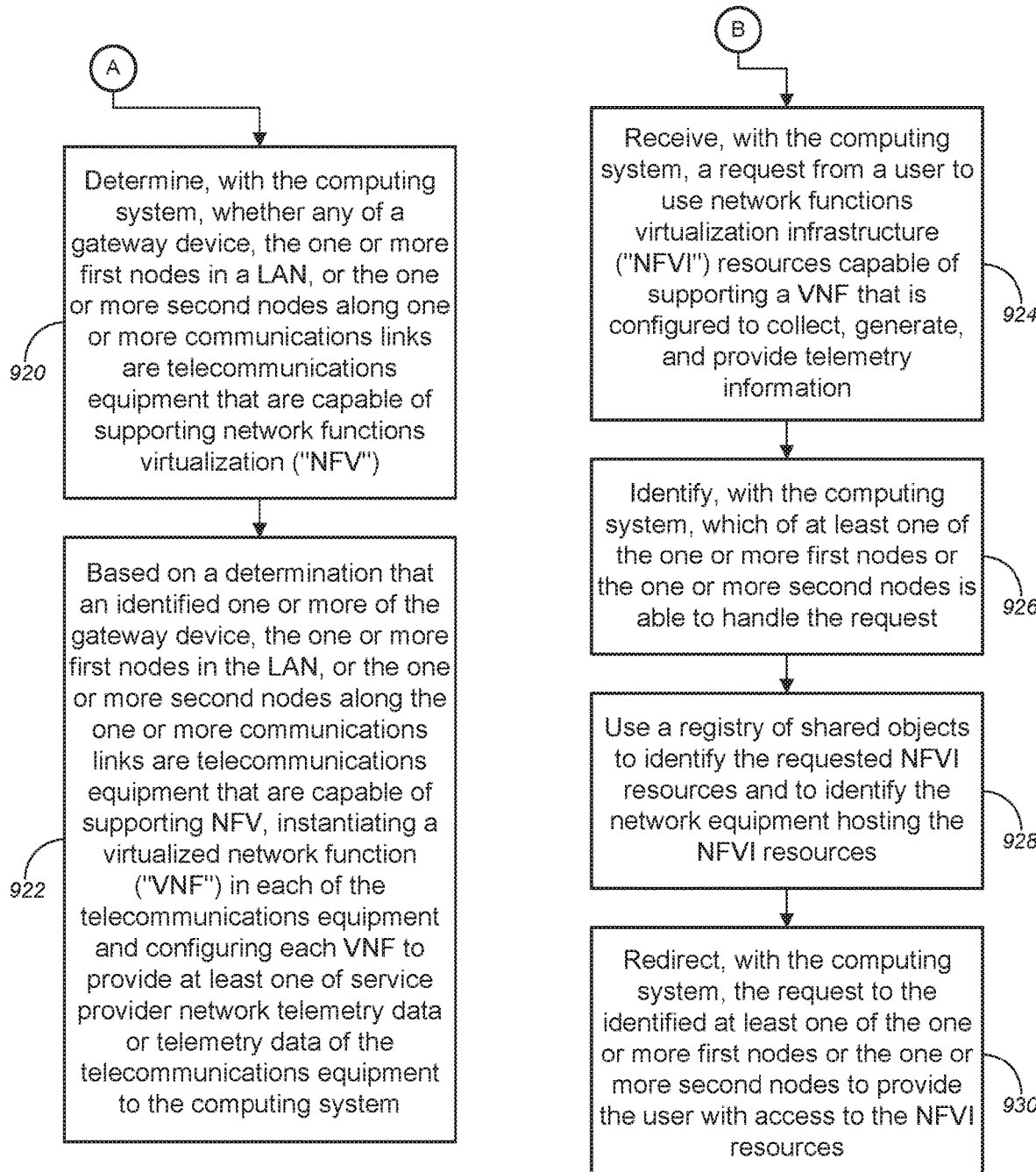

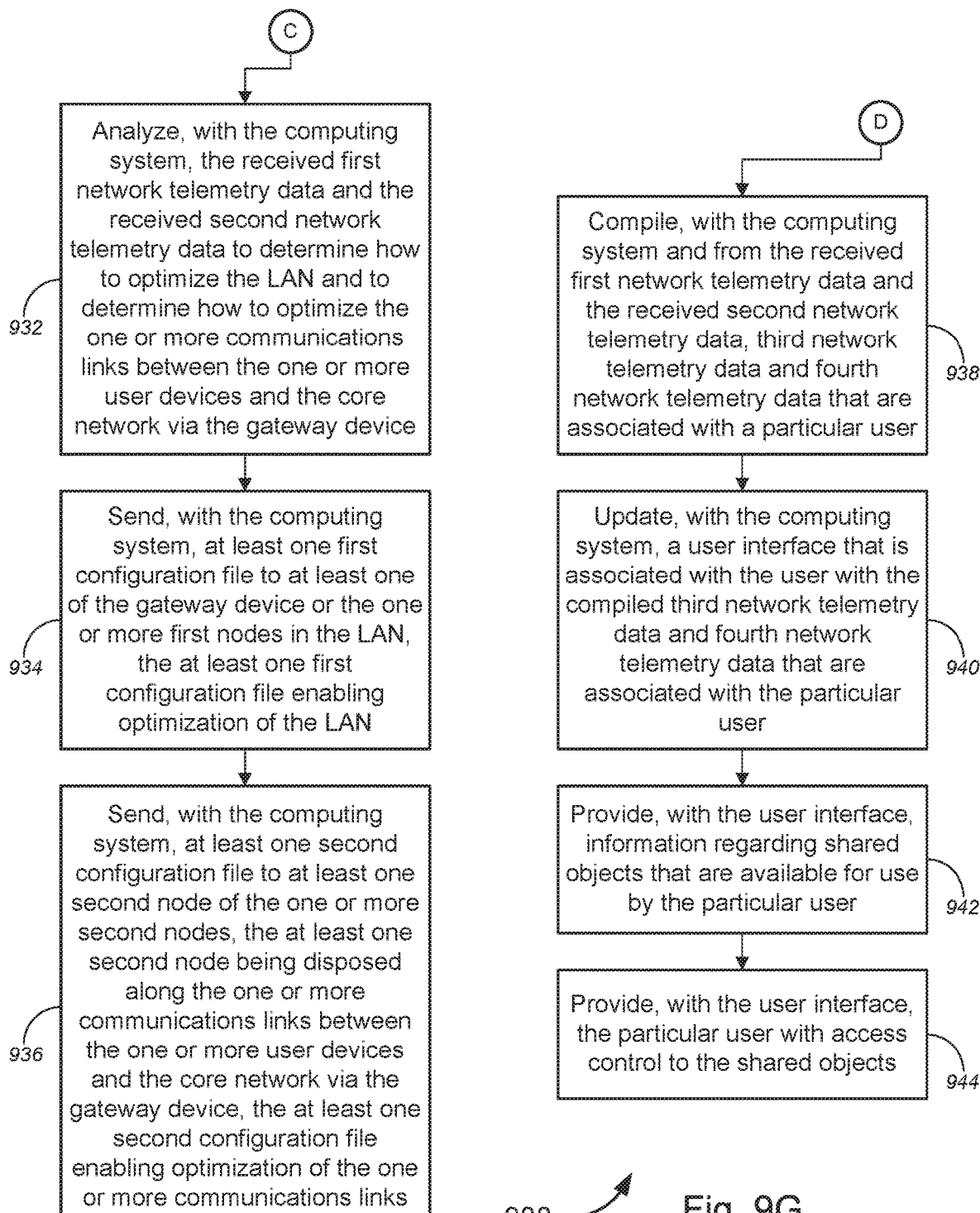

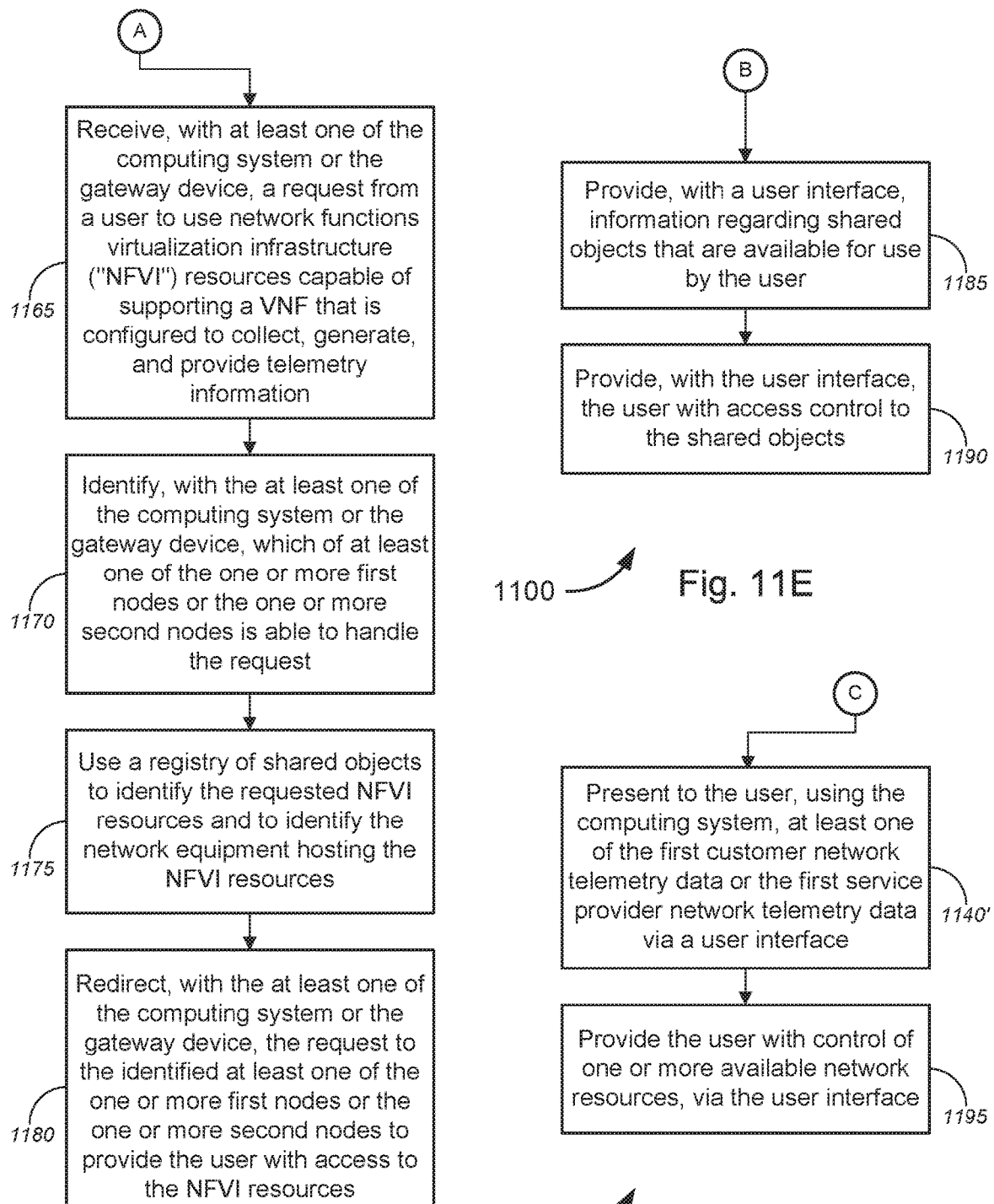

APPLICATION PROGRAMMING INTERFACE (API) TO PROVIDE NETWORK METRICS AND NETWORK RESOURCE CONTROL TO USERS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network application programming interface ("API"), and, more particularly, to methods, systems, and apparatuses for implementing API and/or server or gateway function to provide network metrics and network resource control to users.

BACKGROUND

In conventional network systems, the provider-based wide area network ("WAN") network controllers have access to information or telemetry data associated with network elements or networks including the intermediate networks (e.g., transient carriers, provider networks, etc.), WAN, access network, and end-to-end network operations, administration, and management ("OAM") network tools in order to make automated decisions and to take related actions. The telemetry of the LAN side (i.e., customer side) is often un-used, but may be available to the provider-based network controller. However, none of this telemetry is accessible by the customer. Thus, conventional customer network systems and applications that use the same services do not have access to this telemetry, therefore they cannot integrate into their applications to make use of the information. Further, conventional systems also do not allow a third party (and in some cases the provider itself) access to certain telemetry information on the customer side of the gateway. Further, conventional network systems do not provide a user or customer of network services with access to such telemetry data, nor provide such a user or customer with the ability to control use of network resources.

Hence, application coders (e.g., customer, provider, and $3^{rd}$ party) have a need for more robust and scalable solutions for accessing telemetry via a dual network telemetry application programming interface ("API") framework and/or via API and/or server or gateway function to provide network metrics and network resource control to users.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 8A-8G are flow diagrams illustrating a method for implementing dual network telemetry API framework, in accordance with various embodiments.

FIGS. 9A-9G are flow diagrams illustrating another method for implementing dual network telemetry API framework, in accordance with various embodiments.

FIGS. 11A-11F are flow diagrams illustrating a method for implementing API to provide network metrics and network resource control to users, in accordance with various embodiments.

DETAILED DESCRIPTION OF CERTAIN EMBODIMENTS

Overview

Figure 1A:
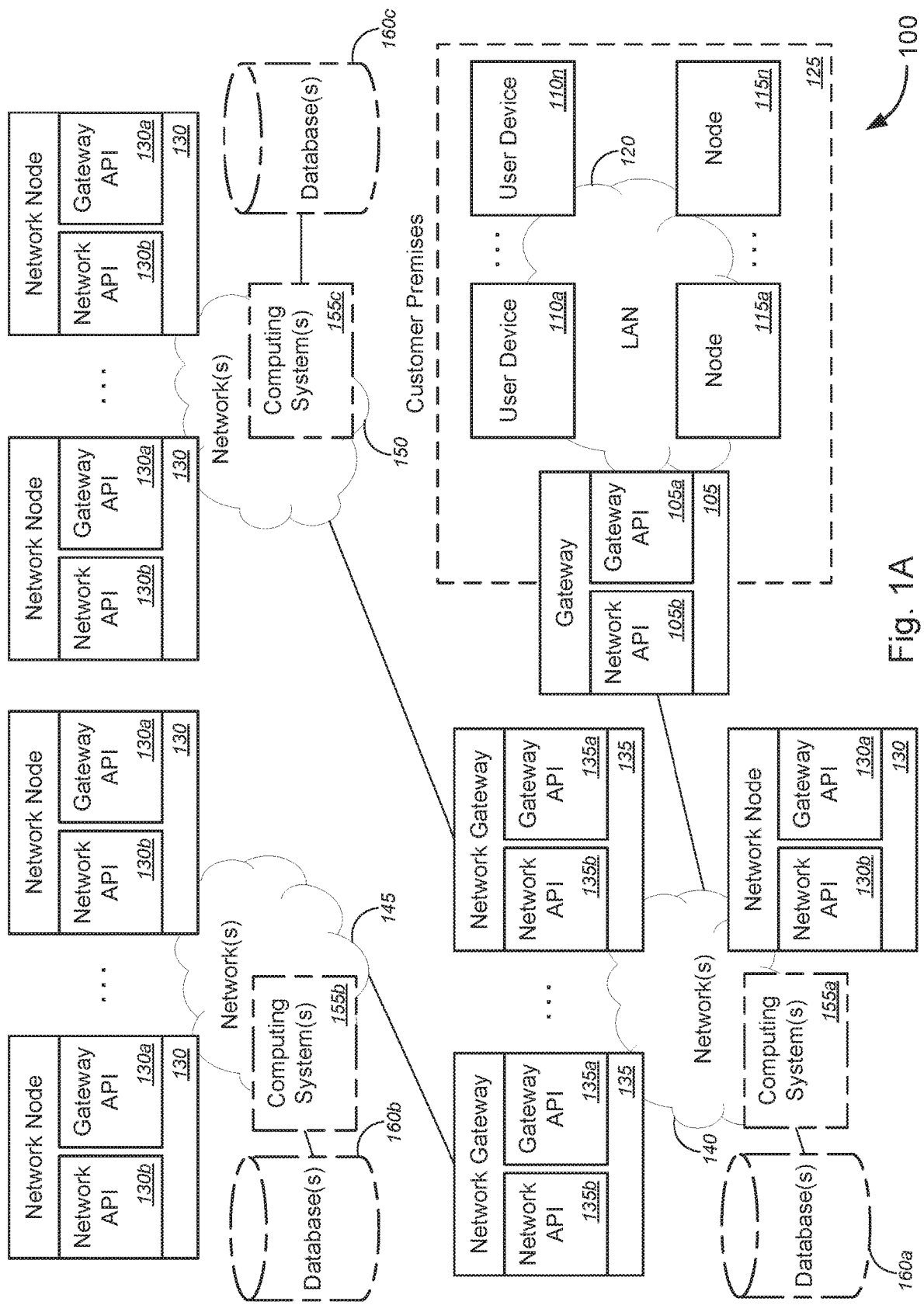
FIGS. 1A and 1B are schematic diagrams illustrating various systems for implementing dual network telemetry application programming interface ("API") framework and implementing API to provide network metrics and network resource control to users, in accordance with various embodiments.

Various embodiments provide tools and techniques for implementing network application programming interface ("API"), and, more particularly, to methods, systems, and apparatuses for implementing API and/or server or gateway function to provide network metrics and network resource control to users.

In various embodiments, a computing system might receive customer network telemetry data from a first network via a gateway application programming interface ("API"), might receive service provider network telemetry data via a network API, might compile the customer network telemetry data, might compile the service provider network telemetry data, and might receive a request from a user to access information regarding network services associated with the user. In response to receiving the request from the user, the computing system might filter the compiled customer network telemetry data to isolate first customer network telemetry data that is associated with the network services associated with the user and might filter the compiled service provider network telemetry data to isolate first service provider network telemetry data that is associated with the network services associated with the user. The computing system might subsequently provide the user with access to at least one of the first customer network telemetry data or the first service provider network telemetry data, and might provide the user with options to control network resources.

According to some embodiments, a service provide may have multiple telemetry gateways, one or more on the core network, one or more on other networks (e.g., access network(s), WAN(s), etc.), and one or more on a network interface device at the customer premises (e.g., NID, CPE, etc.). In some embodiments, the computing system might comprise at least one of an API gateway, a network gateway, an access provider telemetry gateway, a residential gateway ("RG"), a business gateway ("BG"), a virtual gateway ("vG"; which can be disposed either in the LAN or in the WAN or other network, or the like), a network interface device ("NID"), at least one of the one or more user devices, a third party computing system, a customer computing system, an internal network-to-network interface ("INNI") system, an external network-to-network interface ("ENNI") system, a network server, a distributed computing system, or a cloud computing system, and/or the like. In some cases, the RG, the BG, the NID, and/or the like might be customer premises equipment ("CPE"). In some embodiments, the gateway functionality may have a registry of the telemetry information or data in the form of a "micro service," physical, logical, virtual, or application, and may be exposed to the customer as a telemetry service. According to some embodiments, the gateway device might comprise at least one of an API gateway, a network gateway, an access provider telemetry gateway, a residential gateway ("RG"), a business gateway ("BG"), a virtual gateway ("vG"), or a network interface device ("NID"), and/or the like.

In some cases, the information regarding one or more communications links between the LAN and the WAN via the gateway device (which may be provided by the telemetry gateway function) might comprise at least one of telemetry data regarding one or more communications links between the one or more user devices and the gateway device, telemetry data regarding one or more communications links between the gateway device and an edge router disposed between an access network and a core network, telemetry data regarding network equipment connected by the one or more communications links between the gateway device and the edge router, telemetry data regarding the edge router, telemetry data regarding one or more communications links between the gateway device and one or more network elements disposed in the access network, telemetry data regarding network equipment connected by the one or more communications links between the gateway device and the one or more network elements, telemetry data regarding the one or more network elements, telemetry data regarding one or more communications links in one or more networks (e.g., WAN or other network, or the like), telemetry data regarding network elements in the WAN connected by the one or more communications links in the WAN, telemetry data regarding one or more communications links on a communications path between one or more devices in the LAN and one or more network nodes in the WAN obtainable via the gateway device, telemetry data regarding one or more communications links on a communications path between one or more devices in the LAN and one or more network nodes in the WAN obtainable via the gateway device, or end-to-end ("E2E") telemetry data regarding one or more communications links between the one or more user devices and the core network via the gateway device, and/or the like.

The various embodiments thus utilize dual network telemetry (i.e., customer network telemetry and service provider network telemetry as described above) to enable the customer to make automated and advanced choices based upon the state, utilization, and other telemetry otherwise available to the provider via APIs, and in some cases, to also optimize the various networks (e.g., LAN, WAN, etc.) in terms of use and functionality, as further described in detail in the '124 and the '189 Applications (which have been incorporated herein by reference in its entirety for all purposes), and to provide network metrics and network resource control to users. The various embodiments also provide the service provider and authorized third parties to customer network telemetry information on the customer side of the gateway via APIs. The various embodiments are also applicable to networks (e.g., intermediate networks, or the like) associated with two (or more) different service providers, in which each service provider is provided with telemetry data of the network associated with the other service provider via APIs and via external network-to-network interfaces ("ENNIs") or the like.

These and other functionalities are described in detail below with respect to the various figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network technology, network communications technology, service provider network telemetry technology, and/or the like. In other aspects, certain embodiments, can improve the functioning of network systems themselves (e.g., LAN, WAN, other networks, etc.), for example, by receiving, with a computing system, customer network telemetry data via a gateway application programming interface ("API") (the customer network telemetry data comprising information regarding a local area network ("LAN") associated with one or more user devices and information regarding a gateway device that connects the one or more user devices to one or more service provider networks) or first network telemetry data via a first network API (the first network telemetry data comprising information regarding a first network and information regarding at least one network equipment in the first network); receiving, with the computing system, service provider network telemetry data via a network API (the service provider network telemetry data comprising information regarding the one or more service provider networks and information regarding at least one network equipment in each of the one or more service provider networks) or second network telemetry data via a second network API (the second network telemetry data comprising information regarding one or more second networks and information regarding at least one network equipment in each of the one or more second networks); compiling, with the computing system, the customer network telemetry data; compiling, with the computing system, the service provider network telemetry data; receiving, with the computing system, a request from a user to access information regarding network services associated with the user; in response to receiving the request from the user, filtering, with the computing system, the compiled customer network telemetry data to isolate first customer network telemetry data that is associated with the network services associated with the user, and filtering, with the computing system, the compiled service provider network telemetry data to isolate first service provider network telemetry data that is associated with the network services associated with the user; and presenting to the user, using the computing system, at least one of the first customer network telemetry data or the first service provider network telemetry data; and/or the like.

In particular, to the extent any abstract concepts are present in the various embodiments, those concepts can be implemented as described herein by devices, software, systems, and methods that involve specific novel functionality (e.g., steps or operations), such as, in response to receiving a request from a user to access information regarding network services associated with the user, the computing system filters the compiled customer network telemetry data to isolate first customer network telemetry data that is associated with the network services associated with the user and filters the compiled service provider network telemetry data to isolate first service provider network telemetry data that is associated with the network services associated with the user. The computing system then presents to the user, using the computing system, at least one of the first customer network telemetry data or the first service provider network telemetry data, and in some cases, provides the user with the ability to access, manage, and/or control network resources, etc., and/or the like, to name a few examples, that extend beyond mere conventional computer processing operations. These functionalities can produce tangible results outside of the implementing computer system, including, merely by way of example, optimized use and functionality of telemetry API that provides a user with the ability to access, manage, and/or control network resources in one or more networks (e.g., LAN, WAN, other networks, etc.), and/or the like, at least some of which may be observed or measured by customers and/or service providers.

In an aspect, a method might comprise receiving, with a computing system, customer network telemetry data via a gateway application programming interface ("API"). The customer network telemetry data might comprise information regarding a local area network ("LAN") associated with one or more user devices and information regarding a gateway device that connects the one or more user devices to one or more service provider networks. The method might further comprise receiving, with the computing system, service provider network telemetry data via a network API. The service provider network telemetry data might comprise information regarding the one or more service provider networks and information regarding at least one network equipment in each of the one or more service provider networks. The method might comprise compiling, with the computing system, the customer network telemetry data; compiling, with the computing system, the service provider network telemetry data; and receiving, with the computing system, a request from a user to access information regarding network services associated with the user. In response to receiving the request from the user, the method might further comprise filtering, with the computing system, the compiled customer network telemetry data to isolate first customer network telemetry data that is associated with the network services associated with the user, and filtering, with the computing system, the compiled service provider network telemetry data to isolate first service provider network telemetry data that is associated with the network services associated with the user. The computing system might further comprise presenting to the user, using the computing system, at least one of the first customer network telemetry data or the first service provider network telemetry data.

In some embodiments, the computing system might comprise at least one of an API gateway, a network gateway, an access provider telemetry gateway, a residential gateway ("RG"), a business gateway ("BG"), a virtual gateway ("vG"), a network interface device ("NID"), at least one of the one or more user devices, a third party computing system, a customer computing system, an internal network-to-network interface ("INNI") system, an external network-to-network interface ("ENNI") system, a network server, a distributed computing system, or a cloud computing system, and/or the like.

According to some embodiments, the gateway device might comprise at least one of an API gateway, a network gateway, an access provider telemetry gateway, a residential gateway ("RG"), a business gateway ("BG"), a virtual gateway ("vG"), or a network interface device ("NID"), and/or the like.

Merely by way of example, the information regarding one or more communications links in the one or more service provider networks and the information regarding at least one network equipment in each of the one or more service provider networks might comprise at least one of telemetry data regarding one or more communications links between the one or more user devices and the gateway device, telemetry data regarding one or more communications links between the gateway device and an edge router disposed between an access network and a core network, telemetry data regarding network equipment connected by the one or more communications links between the gateway device and the edge router, telemetry data regarding the edge router, telemetry data regarding one or more communications links between the gateway device and one or more network elements disposed in the access network, telemetry data regarding network equipment connected by the one or more communications links between the gateway device and the one or more network elements, telemetry data regarding the one or more network elements, telemetry data regarding one or more communications links in a wide area network ("WAN"), telemetry data regarding network elements in the WAN connected by the one or more communications links in the WAN, telemetry data regarding one or more communications links on a communications path between one or more devices in the LAN and one or more network nodes in the WAN obtainable via the gateway device, telemetry data regarding one or more communications links on a communications path between one or more devices in the LAN and one or more network nodes in the WAN obtainable via the gateway device, or end-to-end ("E2E") telemetry data regarding one or more communications links between the one or more user devices and the core network via the gateway device, and/or the like.

In some embodiments, receiving the customer network telemetry data via the gateway API might comprise receiving, with the computing system, customer network telemetry data via the gateway API by pulling the customer network telemetry data from the one or more first nodes of the LAN via the gateway API. Similarly, receiving the service provider network telemetry data via the network API might comprise receiving, with the computing system, service provider network telemetry data via the network API by pulling the service provider network telemetry data from the one or more second nodes of each of the one or more service provider networks via the network API.

According to some embodiments, the customer network telemetry data are published to a first repository by at least one first node of the one or more first nodes in the LAN and the service provider network telemetry data are published to a second repository by at least one second node of the one or more second nodes in each of the one or more service provider networks. In some cases, receiving the customer network telemetry data via the gateway API might comprise receiving, with the computing system, customer network telemetry data via the gateway API by subscribing to the first repository, and receiving the service provider network telemetry data via the network API might comprise receiving, with the computing system, service provider network telemetry data via the network API by subscribing to the second repository. The first repository and the second repository might be the same repository.

Merely by way of example, in some cases, the customer network telemetry data and the service provider network telemetry data might each comprise at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding a processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices, and/or the like.

In some embodiments, at least one of the gateway device or the one or more first nodes in LAN might identify one or more first shared objects in the LAN and might broadcast to other nodes an indication that the one or more first shared objects are available to be shared, the one or more first shared objects each being an abstraction of at least one of information or one or more resources that exist in the LAN. The one or more resources might comprise at least one of physical network resources, logical network resources, virtual resources, or application layer resources, and/or the like. Similarly, at least one of the one or more second nodes might identify one or more second shared objects in the corresponding one or more service provider networks and might broadcast to other nodes an indication that the one or more second shared objects are available to be shared, the one or more second shared objects each being an abstraction of at least one of information or one or more resources that exist in the corresponding one or more service provider networks. The one or more resources might comprise at least one of physical network resources, logical network resources, virtual resources, or application layer resources, and/or the like.

In some embodiments, the method might further comprise receiving, with at least one of the computing system or the gateway device, a request from a user to use network functions virtualization infrastructure ("NFVI") resources capable of supporting a VNF that is configured to collect, generate, and provide telemetry information; identifying, with the at least one of the computing system or the gateway device, which of at least one of the one or more first nodes or the one or more second nodes is able to handle the request; and redirecting, with the at least one of the computing system or the gateway device, the request to the identified at least one of the one or more first nodes or the one or more second nodes to provide the user with access to the NFVI resources. In some instances, identifying which of at least one of the one or more first nodes or the one or more second nodes is able to handle the request might comprise using a registry of shared objects to identify the requested NFVI resources and to identify the network equipment hosting the NFVI resources. The shared objects are each an abstraction of at least one of information or one or more resources that exist in at least one of the LAN or the one or more service provider networks.

According to some embodiments, presenting to the user at least one of the first customer network telemetry data or the first service provider network telemetry data might comprise presenting, with the computing system, the at least one of the first customer network telemetry data or the first service provider network telemetry data via a user interface accessible by the user, wherein the user interface comprises at least one of a customer web portal, a software application ("app") user interface, or a dedicated customer API user interface. In some cases, the user interface might provide information regarding shared objects that are available for use by the user, and might provide the user with access control to the shared objects. In some embodiments, the information regarding shared objects that are available for use by the user might be based at least in part on information obtained from a registry of shared objects. In some embodiments, the method might comprise providing the user with control of one or more available network resources, via the user interface.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive customer network telemetry data via a gateway application programming interface ("API"), the customer network telemetry data comprising information regarding a local area network ("LAN") associated with one or more user devices and information regarding a gateway device that connects the one or more user devices to one or more service provider networks; receive service provider network telemetry data via a network API, the service provider network telemetry data comprising information regarding the one or more service provider networks and information regarding at least one network equipment in each of the one or more service provider networks; compile the customer network telemetry data; compile the service provider network telemetry data; receive a request from a user to access information regarding network services associated with the user; in response to receiving the request from the user, filter the compiled customer network telemetry data to isolate first customer network telemetry data that is associated with the network services associated with the user, and filter the compiled service provider network telemetry data to isolate first service provider network telemetry data that is associated with the network services associated with the user; and present to the user at least one of the first customer network telemetry data or the first service provider network telemetry data.

In some embodiments, the apparatus might comprise at least one of an API gateway, a network gateway, an access provider telemetry gateway, a residential gateway ("RG"), a business gateway ("BG"), a virtual gateway ("vG"), a network interface device ("NID"), at least one of the one or more user devices, a third party computing system, a customer computing system, an internal network-to-network interface ("INNI") system, an external network-to-network interface ("ENNI") system, a network server, a distributed computing system, or a cloud computing system, and/or the like.

According to some embodiments, the gateway device might comprise at least one of an API gateway, a network gateway, an access provider telemetry gateway, a residential gateway ("RG"), a business gateway ("BG"), a virtual gateway ("vG"), or a network interface device ("NID"), and/or the like.

In some cases, the information regarding at least one network equipment in each of the one or more service provider networks might comprise at least one of telemetry data regarding one or more communications links between the one or more user devices and the gateway device, telemetry data regarding one or more communications links between the gateway device and an edge router disposed between an access network and the core network, telemetry data regarding network equipment connected by the one or more communications links between the gateway device and the edge router, telemetry data regarding the edge router, telemetry data regarding one or more communications links between the gateway device and one or more network elements disposed in the access network, telemetry data regarding network equipment connected by the one or more communications links between the gateway device and the one or more network elements, telemetry data regarding the one or more network elements, telemetry data regarding one or more communications links in a wide area network ("WAN"), telemetry data regarding network elements in the WAN connected by the one or more communications links in the WAN, telemetry data regarding one or more communications links on a communications path between one or more devices in the LAN and one or more network nodes in the WAN obtainable via the gateway device, telemetry data regarding one or more communications links on a communications path between one or more devices in the LAN and one or more network nodes in the WAN obtainable via the gateway device, or end-to-end ("E2E") telemetry data regarding one or more communications links between the one or more user devices and the core network via the gateway device, and/or the like.

Merely by way of example, in some cases, the customer network telemetry data and the service provider network telemetry data might each comprise at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding a processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices, and/or the like.

In some embodiments, the set of instructions, when executed by the at least one processor, causes the apparatus to: receive a request from a user to use network functions virtualization infrastructure ("NFVI") resources capable of supporting a VNF that is configured to collect, generate, and provide telemetry information; identify which of at least one of the one or more first nodes or the one or more second nodes is able to handle the request; and redirect the request to the identified at least one of the one or more first nodes or the one or more second nodes to provide the user with access to the NFVI resources. In some instances, identifying which of at least one of the one or more first nodes or the one or more second nodes is able to handle the request might comprise using a registry of shared objects to identify the requested NFVI resources and to identify the network equipment hosting the NFVI resources. The shared objects might each be an abstraction of at least one of information or one or more resources that exist in at least one of the LAN or the one or more service provider networks.

According to some embodiments, presenting to the user at least one of the first customer network telemetry data or the first service provider network telemetry data might comprise presenting the at least one of the first customer network telemetry data or the first service provider network telemetry data via a user interface accessible by the user, wherein the user interface comprises at least one of a customer web portal, a software application ("app") user interface, or a dedicated customer API user interface. In some cases, the user interface might provide information regarding shared objects that are available for use by the user, and might provide the user with access control to the shared objects. The information regarding shared objects that are available for use by the user might be based at least in part on information obtained from a registry of shared objects. In some instances, the set of instructions, when executed by the at least one processor, causes the apparatus to provide the user with control of one or more available network resources, via the user interface.

In yet another aspect, a system might comprise one or more first nodes in a local area network ("LAN"), one or more second nodes in each of the one or more service provider networks, and a computing system. Each first node might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first node to: obtain customer network telemetry data comprising information regarding the LAN and information regarding a gateway that connects the one or more user devices to one or more service provider networks; and send the customer network telemetry data to a computing system via a gateway application programming interface ("API").

Each second node might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second node to: obtain service provider network telemetry data comprising information regarding a corresponding one of the one or more service provider networks and information regarding at least one network equipment in the corresponding one of one or more service provider networks; and send the service provider network telemetry data to the computing system via a network API.

The computing system might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the computing system to: receive the customer network telemetry data via the gateway API; receive the service provider network telemetry data via the network API; compile the customer network telemetry data; compile the service provider network telemetry data; receive a request from a user to access information regarding network services associated with the user; in response to receiving the request from the user, filter the compiled customer network telemetry data to isolate first customer network telemetry data that is associated with the network services associated with the user, and filter the compiled service provider network telemetry data to isolate first service provider network telemetry data that is associated with the network services associated with the user; and present to the user at least one of the first customer network telemetry data or the first service provider network telemetry data.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-13 illustrate some of the features of the method, system, and apparatus for implementing network application programming interface ("API"), and, more particularly, to methods, systems, and apparatuses for implementing API and/or server or gateway function to provide network metrics and network resource control to users, as referred to above. The methods, systems, and apparatuses illustrated by FIGS. 1-13 refer to examples of different embodiments that include various components and steps, which can be considered alternatives or which can be used in conjunction with one another in the various embodiments. The description of the illustrated methods, systems, and apparatuses shown in FIGS. 1-13 is provided for purposes of illustration and should not be considered to limit the scope of the different embodiments.

Figure 1B:
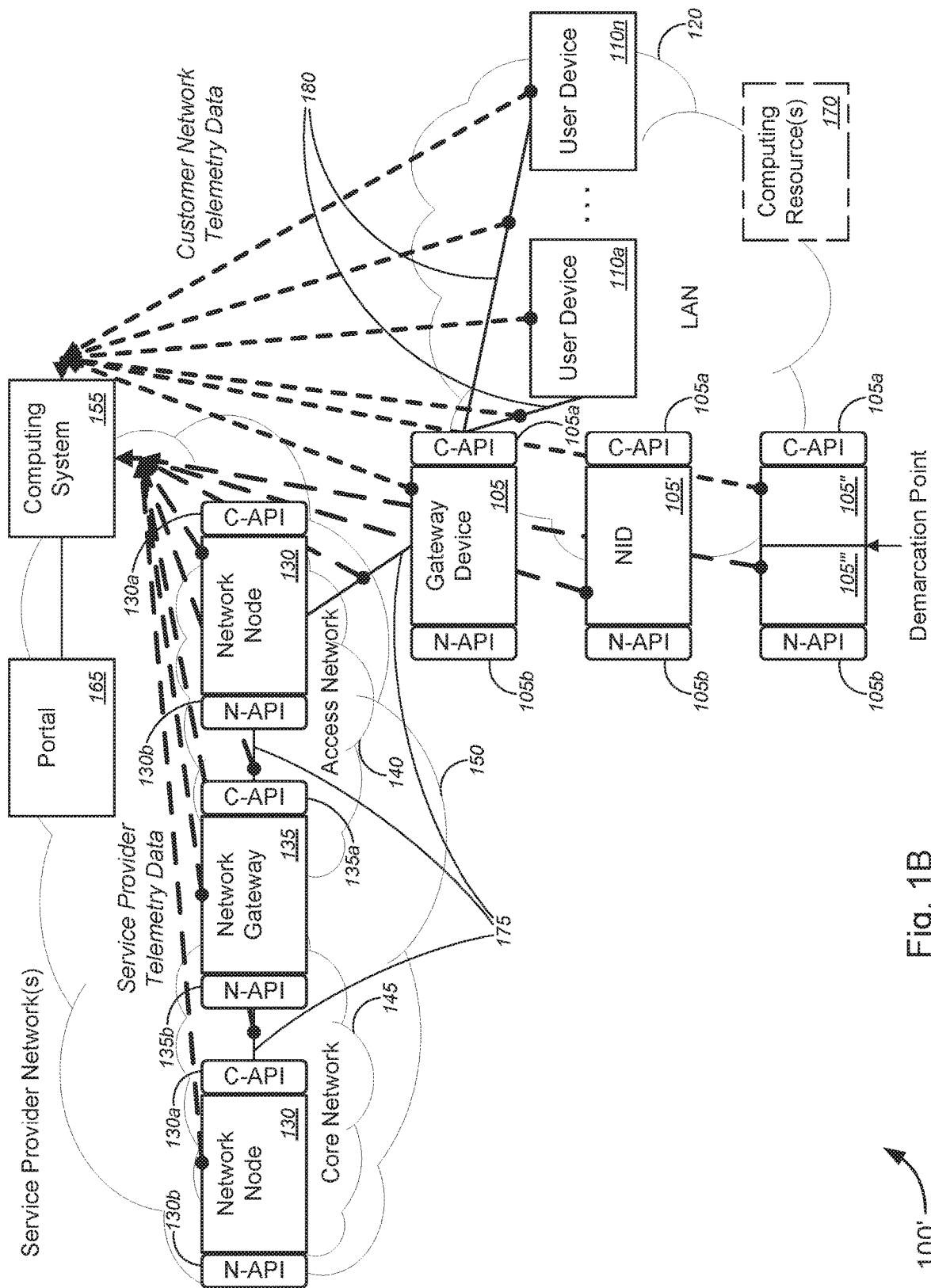

With reference to the figures, FIGS. 1A and 1B are schematic diagrams illustrating various systems 100 and 100' for implementing dual network telemetry application programming interface ("API") framework and implementing API and/or server or gateway function to provide network metrics and network resource control to users, in accordance with various embodiments.

In the non-limiting example of FIG. 1A, system 100 might comprise a gateway device 105, one or more user devices 110a-110n (collectively, "user devices 110" or the like), one or more nodes 115a-115n (collectively, "nodes 115" or the like), and/or the like that are in communication with and/or are part of a local area network ("LAN") 120 that is disposed within customer premises 125. Although one customer premises 125 is shown, this is merely for simplicity of illustration. Rather, the various embodiments are intended to support implementation of the dual network telemetry API framework that extends into a plurality of LANs disposed in a plurality of customer premises (similar to customer premises 125), where such customer premises might include, without limitation, residences, multi-dwelling units (as a whole or as sub-units), commercial offices, other commercial facilities, and/or the like.

System 100 might further comprise one or more network nodes 130 and one or more network gateways 135 that are disposed within one or more networks 140 (e.g., a metro wide area network ("WAN"), or the like), within one or more networks 145 (e.g., a regional WAN, or the like), within one or more networks 150 (e.g., a national backbone, the Internet, or the like), and/or the like. System 100 might optionally comprise computing systems 155a, 155b, and 155c (collectively, "computing systems 155" or the like) and corresponding databases 160a, 160b, and 160c (collectively, "databases 160" or the like) that may be disposed in networks 140, 145, and 150, respectively, or the like.

The gateway device 105 might comprise a gateway application programming interface ("API") 105a and a network API 105b, while each of the network nodes 130 might comprise a gateway API 130a and a network API 130b, and each of the network gateways 135 might comprise a gateway API 135a and a network API 135b. In some embodiments, the gateway device 105 might include, without limitation, at least one of an API gateway, a network gateway, an access provider telemetry gateway, a residential gateway ("RG"), a business gateway ("BG"), a virtual gateway ("vG"), or a network interface device ("NID"), and/or the like. Each of the computing systems 155 might include, but is not limited to, at least one of an API gateway, a network gateway, an access provider telemetry gateway, a residential gateway ("RG"), a business gateway ("BG"), a virtual gateway ("vG") (which might be disposed in either the LAN 120 and/or the networks 140, 145, and/or 150, or the like), a network interface device ("NID"), a third party computing system, a customer computing system, an internal network-to-network interface ("INNI") system, an external network-to-network interface ("ENNI") system, a network server, one of the network gateways 135 or network nodes 130, a distributed computing system, or a cloud computing system, and/or the like.

In operation, at least one of the gateway device 105, the node(s) 115, the network node(s) 130, the network gateway (s) 135, and/or the computing system(s) 155 might receive customer network telemetry data via the gateway API 105a, 130a, or 135a. The customer network telemetry data might include, but is not limited to, information regarding LAN 120 associated with the one or more user devices 110 and/or information regarding the gateway device 105 that connects the one or more user devices 110 to an access network, a wide area network ("WAN"), or a core network of a service provider (i.e., at least one of networks 140, 145, and/or 150, or the like), and/or the like. The at least one of the gateway device 105, the node(s) 115, the network node(s) 130, the network gateway(s) 135, and/or the computing system(s) 155 might also receive service provider network telemetry data via the network API 105b, 130b, or 135b. The service provider network telemetry data might comprise information regarding one or more communications links along at least portions of one or more networks between the LAN 120 and the one or more networks 140, 145, and/or 150 via the gateway device 105. In some embodiments, the information regarding one or more communications links along the at least portions of the one or more service provider networks between the one or more user devices and the core network via the gateway device (or regarding one or more communications links between the LAN and the WAN) might include, without limitation, at least one of telemetry data regarding one or more communications links between the one or more user devices and the gateway device, telemetry data regarding one or more communications links between the gateway device and an edge router disposed between an access network and a core network, telemetry data regarding network equipment connected by the one or more communications links between the gateway device and the edge router, telemetry data regarding the edge router, telemetry data regarding one or more communications links between the gateway device and one or more network elements (e.g., a digital subscriber line access multiplexer ("DSLAM"), optical network terminal ("ONT"), or optical line terminal ("OLT"), or the like) disposed in the access network, telemetry data regarding network equipment connected by the one or more communications links between the gateway device and the one or more network elements, telemetry data regarding the one or more network elements, telemetry data regarding one or more communications links in at least one of the network(s) 140, 145, and/or 150 (e.g., WAN or other network, or the like), telemetry data regarding network elements in the WAN connected by the one or more communications links in the WAN, telemetry data regarding one or more communications links on a communications path between one or more devices in the LAN and one or more network nodes in the WAN obtainable via the gateway device, telemetry data regarding one or more communications links on a communications path between one or more devices in the LAN and one or more network nodes in the WAN obtainable via the gateway device, or end-to-end ("E2E") telemetry data regarding one or more communications links between the one or more user devices and the core network via the gateway device, and/or the like.

According to some embodiments, the customer network telemetry data might be pulled via the gateway device API, while the service provider network telemetry data might be pulled from the network nodes 130 and/or the network gateways 135 (and in some cases, nodes 115 and/or computing systems 155, as well) via network API 105b, 130b, or 135b or the like. Alternatively, the customer network telemetry data might be published to a first repository (e.g., repository 270a as shown in FIG. 2B or the like) by the gateway device 105, while the service provider network telemetry data might be published to a second repository (e.g., repository 270b as shown in FIG. 2B or the like) by the network gateways 135 and/or network nodes 130 (and in some cases, nodes 115 and/or computing systems 155, as well). The at least one of the gateway device 105, the node(s) 115, the network node(s) 130, the network gateway(s) 135, and/or the computing system(s) 155 might subscribe to each of the first repository and the second repository to receive the customer network telemetry data and the service provider network telemetry data, respectively. In some cases, the first repository and the second repository might be the same repository.

Merely by way of example, in some instances, the customer network telemetry data and the service provider network telemetry data might each include, without limitation, at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding a processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices, and/or the like. In some cases, the customer network telemetry data might include, but is not limited to, application, GUI, or device telemetry data, or the like.

The at least one of the gateway device 105, the node(s) 115, the network node(s) 130, the network gateway(s) 135, and/or the computing system(s) 155 might analyze the received customer network telemetry data and the received service provider network telemetry data to determine how to optimize the LAN and to determine how to optimize the one or more communications links between the one or more user devices and the core network (e.g., in some cases to optimize a WAN or the like as well). In some embodiments, the at least one of the gateway device 105, the node(s) 115, the network node(s) 130, the network gateway(s) 135, and/or the computing system(s) 155 might analyze customer network telemetry data and service provider network telemetry data that are received from various points in the LAN 120 and/or networks 140, 145, and/or 150 to determine how to optimize the LAN 120 and/or the networks 140, 145, and/or 150.

The at least one of the gateway device 105, the node(s) 115, the network node(s) 130, the network gateway(s) 135, and/or the computing system(s) 155 might send at least one first configuration file to at least one of the gateway device or one or more nodes 115 in the LAN, the at least one first configuration file enabling optimization of the LAN. The at least one of the gateway device 105, the node(s) 115, the network node(s) 130, the network gateway(s) 135, and/or the computing system(s) 155 might also send at least one second configuration file to one or more network nodes 130 and/or to the one or more network gateways 135 along the one or more communications links between the LAN 120 and the one or more networks 140, 145, and/or 150 via the gateway device 105, the at least one second configuration file enabling optimization of the one or more communications links.

According to some embodiments, the at least one of the gateway device 105 and/or the one or more nodes 115 might identify one or more first shared objects in the LAN 120 and might broadcast to other nodes an indication that the one or more first shared objects are available to be shared, the one or more first shared objects each being an abstraction of at least one of information or one or more resources that exist in the LAN 120. The one or more resources might include, but are not limited to, at least one of physical network resources, logical network resources, virtual resources, or application layer resources, and/or the like. Similarly, the network node(s) 130, the network gateway(s) 135, and/or the computing system(s) 155 might identify one or more second shared objects along the one or more communications links and might broadcast to other nodes an indication that the one or more second shared objects are available to be shared, the one or more second shared objects each being an abstraction of at least one of information or one or more resources that exist along the one or more communications links. The one or more resources might include, without limitation, at least one of physical network resources, logical network resources, virtual resources, or application layer resources, and/or the like.

In some embodiments, the at least one of the gateway device 105, the node(s) 115, the network node(s) 130, the network gateway(s) 135, and/or the computing system(s) 155 might determine whether any of the gateway device, the one or more nodes 115 in the LAN 120, the one or more second nodes 130, or the one or more network gateways 135, along the one or more communications links are capable of supporting network functions virtualization ("NFV"). Based on a determination that an identified one or more of the gateway device 105, the one or more first nodes 115 in the LAN 120, the one or more second nodes 130, or the one or more network gateways 135 along the one or more communications links are telecommunications equipment that are capable of supporting NFV, instantiating a virtualized network function ("VNF") in each of the telecommunications equipment and configuring each VNF to provide at least one of service provider network telemetry data or telemetry data of the telecommunications equipment to the computing system.

Alternatively, or additionally, the at least one of the gateway device 105, the network node(s) 130, the network gateway(s) 135, and/or the computing system(s) 155 might receive a request from a user to use network functions virtualization infrastructure ("NFVI") resources capable of supporting a VNF that is configured to collect, generate, and provide telemetry information, might identify which of at least one of the one or more nodes 115, the one or more network nodes 130, or the one or more network gateways 135 is able to handle the request, and might redirect the request to the identified at least one of the gateway device 105, the one or more nodes 115, the one or more network nodes 130, the one or more network gateways 135, and/or the like to provide the user with access to the requested NFVI resources. In some cases, identifying which of at least one of the gateway device 105, the one or more nodes 115, the one or more network nodes 130, or the one or more network gateways 135 is able to handle the request might comprise using a registry of shared objects to identify the requested NFVI resources and to identify the network equipment hosting the NFVI resources. The shared objects are each an abstraction of at least one of information or one or more resources that exist in at least one of the LAN 120 or one or more networks 140, 145, and/or 150 along the one or more communications links. In some embodiments, the use of shared objects may or may not be billed. Billing rates may be included in the registry, but may be stored and managed elsewhere.

The at least one of the gateway device 105, the network node(s) 130, the network gateway(s) 135, and/or the computing system(s) 155 might compile customer network telemetry data and service provider network telemetry data that are associated with a particular user from the received customer network telemetry data and the received service provider network telemetry data, and might update a user interface that is associated with the user with the compiled customer network telemetry data and service provider network telemetry data that are associated with the particular user. According to some embodiments, the user interface might include, without limitation, at least one of a customer web portal, a software application ("app") user interface, or a dedicated customer API user interface, and/or the like. In some cases, the user interface might provide information regarding shared objects that are available for use by the particular user, and might provide the particular user with access control to the shared objects.

In some aspects, in response to a determination that the gateway device has become unreachable, an access provider telemetry gateway might send telemetry and state information regarding the gateway device to the at least one of the gateway device 105, the network node(s) 130, the network gateway(s) 135, and/or the computing system(s) 155, the access provider telemetry gateway being separate from the gateway device. In some embodiments, telemetry data could be provided as part of a dying gasp communication where the gateway device 105 has stored sufficient telemetry data to be of use when the main power source has failed. The dying gasp communication might be as described in detail in U.S. patent application Ser. No. 13/928,069 (the "'069 Application"), filed on Jun. 26, 2013 by Mike Fargano et al., entitled, "Use of Dying Gasp to Locate Faults in Communications Networks," which claims priority to U.S. Patent Application Ser. No. 61/665,182 (the "'182 Application"), filed Jun. 27, 2012 by Mike Fargano et al., entitled, "Use of Dying Gasp to Locate Faults in Passive Optical Networks" and U.S. Patent Application Ser. No. 61/787,690 (the "'690 Application"), filed Mar. 15, 2013 by Michael J. Fargano et al., entitled, "Use of Dying Gasp to Locate Faults in Communications Networks," the disclosure of which is incorporated herein by reference in its entirety for all purposes.

In some aspects, some embodiments enable a customer or user to enable the customer or user to develop and manage provider "provided" resources by providing customer managed objects (e.g., like cloud-based objects) via a cloud API or the like.

Alternatively, the computing system (which might be embodied by the gateway device 105, the node(s) 115, the network node(s) 130, the network gateway(s) 135, and/or the computing system(s) 155, and/or the like) might receive first network telemetry data of a first network (e.g., one of LAN 120, network 140, network 145, network 150, or some other network(s), and/or the like) via a gateway API (e.g., gateway API 105a, 130a, or 135a, or the like), might receive second network telemetry data of one or more second networks (e.g., one or more others of LAN 120, network 140, network 145, network 150, or some other network(s), and/or the like) via a network API (e.g., network API 105b, 130b, or 135b, or the like), and might analyze the received first network telemetry data and the received second network telemetry data to determine one or more first instructions to send to the first network (e.g., the one of LAN 120, network 140, network 145, network 150, or some other network(s), and/or the like) to cause one or more first nodes (e.g., corresponding one or more of gateway 105, nodes 115, network nodes 130, network gateways 135, or the like in the one of LAN 120, network 140, network 145, network 150, or some other network(s), and/or the like) to perform at least one first action and to determine one or more second instructions to send to each of the one or more second networks (e.g., the one or more others of LAN 120, network 140, network 145, network 150, or some other network(s), and/or the like) to cause one or more second nodes (e.g., corresponding one or more of gateway 105, nodes 115, network nodes 130, network gateways 135, or the like) to perform at least one second action.

Subsequently, the computing system might send the one or more first instructions to the one or more first nodes in the first network, the one or more first instructions causing the one or more first nodes to perform at least one first action (e.g., to optimize the first network, to add automation capabilities to the first network, to add integration capabilities to the first network, to perform advanced decision making, to perform actions in response to analysis of at least one of the first network telemetry data or the second network telemetry data, to restrict traffic to the first network, to restrict traffic from the first network, to redirect traffic to the first network, to redirect traffic from the first network, to send at least one notification through the first network, to execute a software application in the first network, or to stop/prevent execution of a software application in the first network, and/or the like). The computing system might also send the one or more second instructions to the one or more second nodes in the one or more second networks, the one or more second instructions causing the one or more second nodes to perform at least one second action (e.g., to optimize the second network(s), to add automation capabilities to the second network(s), to add integration capabilities to the second network(s), to perform advanced decision making, to perform actions in response to analysis of at least one of the first network telemetry data or the second network telemetry data, to restrict traffic to the second network(s), to restrict traffic from the second network(s), to redirect traffic to the second network(s), to redirect traffic from the second network(s), to send at least one notification through the second network(s), to execute a software application in the second network(s), or to stop/prevent execution of a software application in the second network(s), and/or the like). In these embodiments in which the first network and the one or more second networks might be associated with two or more separate service providers and not associated with a customer or end-user, one or more external network-to-network interfaces ("ENNIs") might be used to provide or facilitate network-to-network communications.

NFV and Cloud enable a user to purchase and control via a shared object or managed object abstraction approach generally described as shared object framework ("SOF") or managed object framework ("MOF") by the industry. All telemetry is based on a shared object or managed object that can be made visible in a customer portal, and/or used as telemetry by an application.

Services are composed of shared objects or managed objects that are top down (customer context) service components of the service they purchased and can manage.

SOF's or MOF's (shared or managed objects libraries) are present in every major ecosystem, and are also domain specific. Compute, storage, and network in open stack are domain specific network resources that are manageable by the customer and appear in a dashboard. The telemetry of those objects are ecosystem wide, and used by applications, therefore all the network resource object telemetry in this API ecosystem are SOF or MOF abstractions. SOF or MOF principles that may apply with respect to the various embodiments might include, without limitation, top down customer menu oriented applications (i.e., customer service resource abstraction), encapsulation (service-oriented modeling framework ("SOMF") composite), service templates or agility service model, SOF or MOF models—coupled telemetry model, domain specific taxonomy applications, and/or the like. If a customer can manage objects under top down customer menu oriented applications, the objects are managed objects with telemetry. If a customer can add or buy a resource, it is a managed object. For encapsulation, shared objects or managed objects can be groups of shared objects or groups of managed objects with an outer object definition (e.g., a virtual machine ("VM") includes a compute, storage, memory, NIC). Cloud portals use the SOMF resource grouping pattern. Under the service templates model, service templates are composed of shared objects or managed objects to enable on-the-fly service builds by the customer or the provider. Under the managed objects model, service attributes, service states (displayed to the customer), fault, and performance (usage) might be part of describing a shared object or managed object. To define a shared object or managed object, four models might be grouped. Capabilities abstractions might be captured as part of each shared object or shared object subgroup to resolve automating what options the customer has. Capabilities might include Ethernet and capacity in megabytes. Capabilities might include searchable meta-class attributes. Under domain specific taxonomy, each domain may have overlapping objects, but they are separated by domains in the global ecosystem library (e.g., compute vs. storage vs. LAN vs. WAN).

According to some embodiments, specific framework requirements might include, without limitation, NID API, link state, dual network API, model driven telemetry, model registry, open code identification, and/or the like. The NID API might include an ability to communicate telemetry when the network connection is cut, or the like. Link state might include an ability to indicate when the link is not cut, or the like. Dual network API might include an ability to ensure the implemented framework is sufficiently flexible for all providers, or the like. Model driven telemetry might include an ability to open the framework to enable free contribution, or the like. Model registry might include an ability to provide common approved registry, or the like. In a continuously developing environment, code reuse might be an issue, and thus open code identification might include an ability to identify open code to enable and facilitate reused code in the environment, or the like.

In some aspects, at least one of the gateway device 105, the network node(s) 130, and/or the computing system(s) 150 might receive customer network telemetry data via the gateway API 105a. The customer network telemetry data might include, but is not limited to, information regarding LAN 120 associated with the one or more user devices 110 and/or information regarding the gateway device 105 that connects the one or more user devices 110 to one or more service provider networks (i.e., at least one of networks 135, 140, and/or 145, or the like), including a core network of a service provider, and/or the like. The at least one of the gateway device 105, the network node(s) 130, and/or the computing system(s) 150 might also receive network telemetry data via the network API 130a. The network telemetry data might comprise information regarding the one or more service provider networks and information regarding at least one network equipment in each of the one or more service provider networks.

The at least one of the gateway device 105, the network node(s) 130, and/or the computing system(s) 150 might compile the customer network telemetry data, might compile the service provider network telemetry data, and might receive a request from a user to access information regarding network services associated with the user. In response to receiving the request from the user, the at least one of the gateway device 105, the network node(s) 130, and/or the computing system(s) 150 might filter the compiled customer network telemetry data to isolate first customer network telemetry data, and might filter the compiled service provider network telemetry data to isolate first service provider network telemetry data, the first customer network telemetry data and the first service provider network telemetry data might each be associated with the network services associated with the user. The at least one of the gateway device 105, the network node(s) 130, and/or the computing system (s) 150 might present to the user at least one of the first customer network telemetry data or the first service provider network telemetry data.

In some embodiments, presenting to the user at least one of the first customer network telemetry data or the first service provider network telemetry data might comprise presenting, with the computing system, the at least one of the first customer network telemetry data or the first service provider network telemetry data via a user interface accessible by the user. The user interface might include, without limitation, at least one of a customer web portal, a software application ("app") user interface, or a dedicated customer API user interface, and/or the like. In some cases, the user interface might provide information regarding shared objects that are available for use by the user, and might provide the user with access control to the shared objects. In some instances, the information regarding shared objects that are available for use by the user might be based at least in part on information obtained from a registry of shared objects. According to some embodiments, the at least one of the gateway device 105, the network node(s) 130, and/or the computing system(s) 150 might provide the user with control of one or more available network resources, via the user interface.

In the non-limiting example of FIG. 1B, system 100' might comprise gateway devices (e.g., customer location-based gateway 105, service provider associated gateway or network interface device ("NID") 105', gateways 105" and 105'" based in a single device and separated by a demarcation point between LAN 120 and the service provider network(s) 140, 145, and/or 150). System 100' might further comprise user devices 110a-110n (collectively, "user devices 110" or the like), which along with the gateway devices 105, 105', 105", and/or 105'", might be disposed within or in close communication with LAN 120. System 100' might further comprise network nodes 130, network gateway 135, and computing system 155, each of which might be disposed within one or more service provider networks 140, 145, and/or 150. Each of the gateway devices 105, 105', 105", and/or 105'" might comprise a customer network API 105a and a service provider network 105b. Each of network nodes 130 might comprise a customer network API 130a and a service provider network 130b, and the network gateway 135 might comprise a customer network API 135a and a service provider network 135b.

In some embodiments, at least one network node 130 might be disposed in access network 140, while at least one network node 130 might be disposed in a core network 145, and a network gateway 135 might provide an interface (in this case, an internal network-to-network interface ("INNI")) between the at least one network node 130 disposed in access network 140 and the at least one network node 130 disposed in core network 145. The computing system 155 might receive service provider telemetry data from each of the at least one network node 130 disposed in the access network 140, the at least one network node 130 disposed in the core network 145, the network gateway 135, and the NID 105' and/or gateway 105", along with telemetry data from communications links 175 along the one or more service provider networks 140, 145, and 150 (and between the service provider networks and gateway device 105), as depicted by long dash lines leading from these network components and links toward computing system 155. Similarly, computing system 155 might receive customer network telemetry data from gateway 105 and/or 105'", each of user devices 110, and from communications links 180 between gateway 105 and each of user devices 110, as depicted by dash lines leading from these LAN components and links toward computing system 155.

According to some embodiments, system 100' might further comprise portal 165 which allows a user to access the customer network telemetry data and/or the service provider telemetry data via computing system 155. System 100' might further optionally comprise one or more computing resources 170.

Figure 2A:
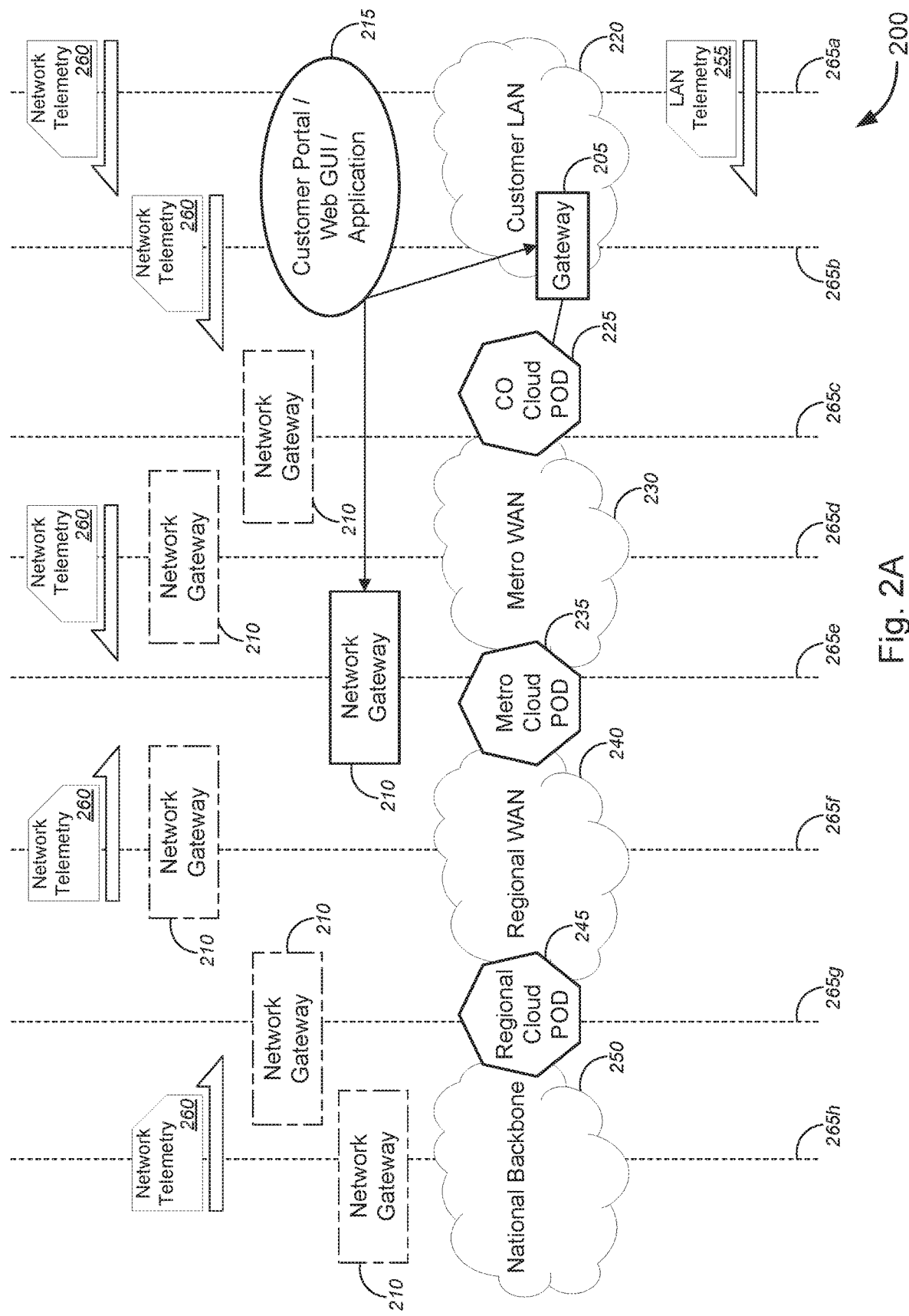
FIGS. 2A and 2B are schematic diagrams illustrating various embodiments of a system that may be used for implementing dual network telemetry API framework and implementing API to provide network metrics and network resource control to users.
Figure 2B:
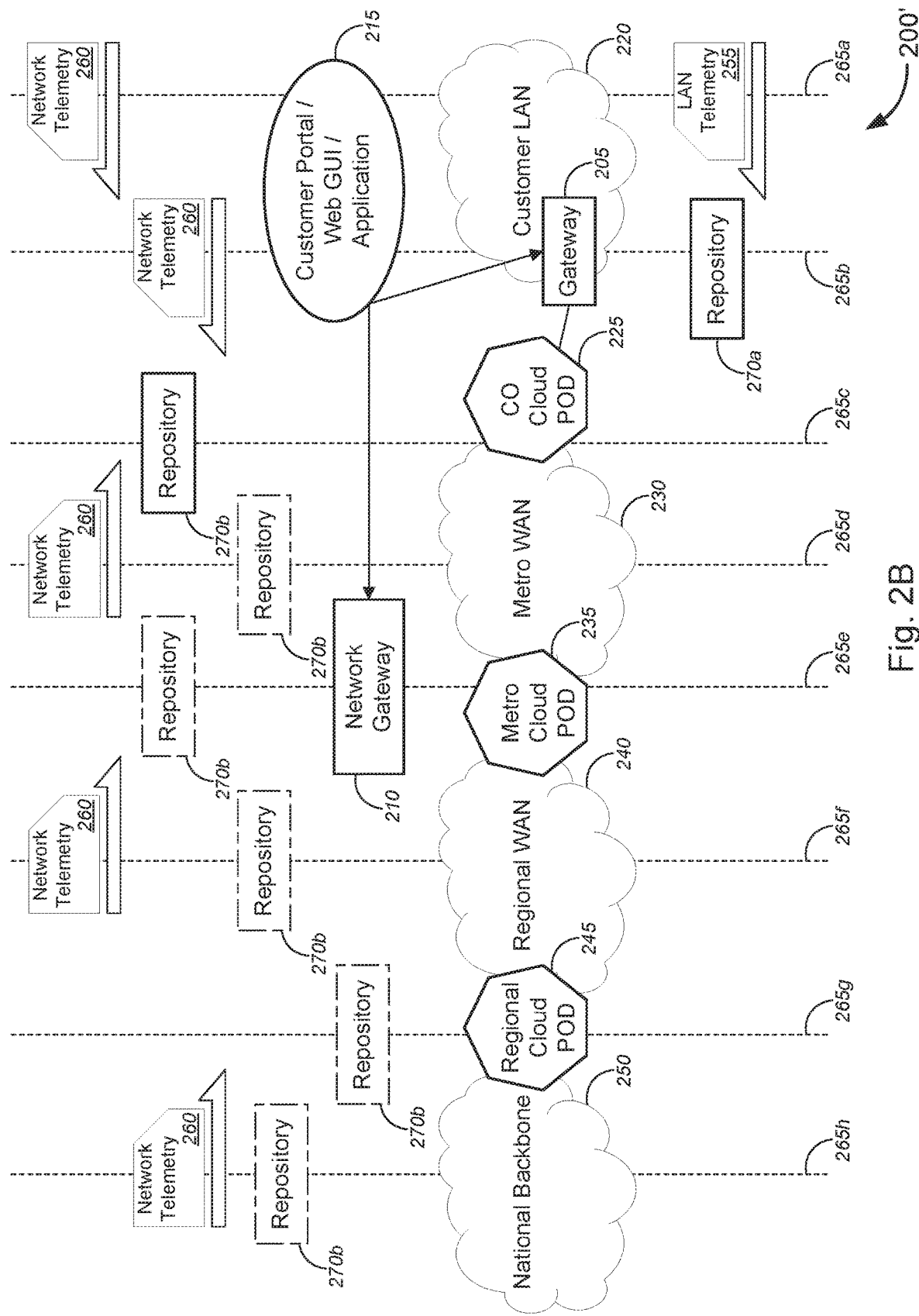

FIGS. 2A and 2B (collectively, "FIG. 2") are schematic diagrams illustrating various embodiments 200 and 200' of a system that may be used for implementing dual network telemetry API framework and implementing API and/or server or gateway function to provide network metrics and network resource control to users.

With reference to FIG. 2A, system 200 might comprise gateway 205, network or API gateway 210, customer portal/web GUI/application 215, customer LAN 220, central office ("CO") cloud point of delivery ("PoD" or "POD") 225, metro WAN 230, metro cloud POD 235, regional WAN 240, regional cloud POD 245, and national backbone 250.

The gateway 205, at point 265b (depicted as a dashed line crossing gateway 205 in LAN 220 in FIG. 2), might receive customer network telemetry 255 from point 265a in LAN 220 (depicted as a dashed line crossing LAN 220 in FIG. 2).

Similarly, network or API gateway 210, at point 265e (depicted as a dashed line crossing network or API Gateway 210 in FIG. 2), might receive service provider network telemetry 260 from points 265a, 265b, 265d, 265f, and 265h. In some embodiments, network or API gateway 210 might alternatively be disposed at any of points 265c, 265d, 265f, 265g, or 265h, or the like (depicted as dash-long dash blocks in FIG. 2A). As described above with reference to FIG. 1, according to some embodiments, the customer network telemetry data 255 might be pulled via a gateway device API of the gateway device 205, while the service provider network telemetry data might be pulled from the network nodes (e.g., nodes 115, network nodes 130, and/or computing systems 150, as well) via network API of the network points 265a, 265b, 265d, 265f, and 265h, or the like.

Alternatively, as shown in FIG. 2B, the customer network telemetry data might be published to a first repository 270a (depicted as a dashed line crossing repository 270a and gateway 205 in FIG. 2B) by the gateway device 205, while the service provider network telemetry data might be published to a second repository 270b (depicted as a dashed line crossing repository 270b in FIG. 2B) by the network nodes (e.g., nodes 115, network nodes 130, and/or computing systems 150, as well) via network API of the network points 265a, 265b, 265d, 265f, and 265g, or the like. In some embodiments, the second repository 270b might alternatively be disposed at any of points 265d, 265e, 265f, 265g, or 265h, or the like (depicted as dash-long dash blocks in FIG. 2B). The gateway device 205 and/or the network or API gateway 210 might subscribe to each of the first repository 270a and the second repository 270b to receive the customer network telemetry data and the service provider network telemetry data, respectively. In some cases, the first repository 270a and the second repository 270b might be the same repository.

The gateway 205, the network or API gateway 210, the customer LAN 220, the metro WAN 230, the regional WAN 240, and the national backbone 250 of systems 200 and 200' of FIGS. 2A and 2B are otherwise similar, if not identical, to the gateway 105, nodes 115/network gateway or nodes 130/computing system(s) 150, LAN 120, network(s) 135, network(s) 140, and network(s) 145 of system 100 of FIG. 1, and the descriptions of these components of system 100 are applicable to the corresponding components of systems 200 and 200', respectively.

In system 200 or 200', there are two API interfaces, the NID interface that delivers customer network telemetry and NID telemetry, and the network gateway that provides end-to-end service telemetry. The NID API provides service state information when the access becomes disconnected from the network, and provides real-time information on the access leg. The network API gateway provides state and use information for the end-to-end service and overall service state.

Both interfaces enable applications, cloud portals, and web browsers to customer network telemetry information on the access, NID, and the network or E2E service.

In some embodiments, the NID API might add a "HTTP REST" server function to the NID admin portal that is typically GUI or HTTP based. All NID telemetry can be shared via that modified HTTP function. Service Attributes that are not normally on the NID may also be added by creating a HTTP re-direct type function to bounce any service model request to a centralized webserver to display the information. Some NIDs might have cloud publication/subscription feature built in. These functions can transmit near-real-time usage data to a subscriber just as a stock ticker function works. In this manner, applications and portals can obtain real-time updates on live utilization, this is described under the API functional set.

According to some embodiments, one key requirement to opening a telemetry API to the customer LAN is to ensure the customer understands that opening the interface enables applications to access the information. It may be necessary to create an application registry to track what application is using what information, which is beyond the scope of this initial specification. In some cases, a means for billing for certain telemetry data may additionally be made available via one or more API's, in some cases based on the application registry or some other tracking functionality. In some embodiments, levels of authentication may be implemented to ensure that only authorized entities can gain access to the telemetry data (via either the gateway API or the network API, or similarly via the customer network API or service provider API, or the like).

This specification does recommend that the customer needs to have the ability to open the API on their NID, and when doing so an acknowledgement that the information made available type message and acceptance needs to occur.

Figure 3:
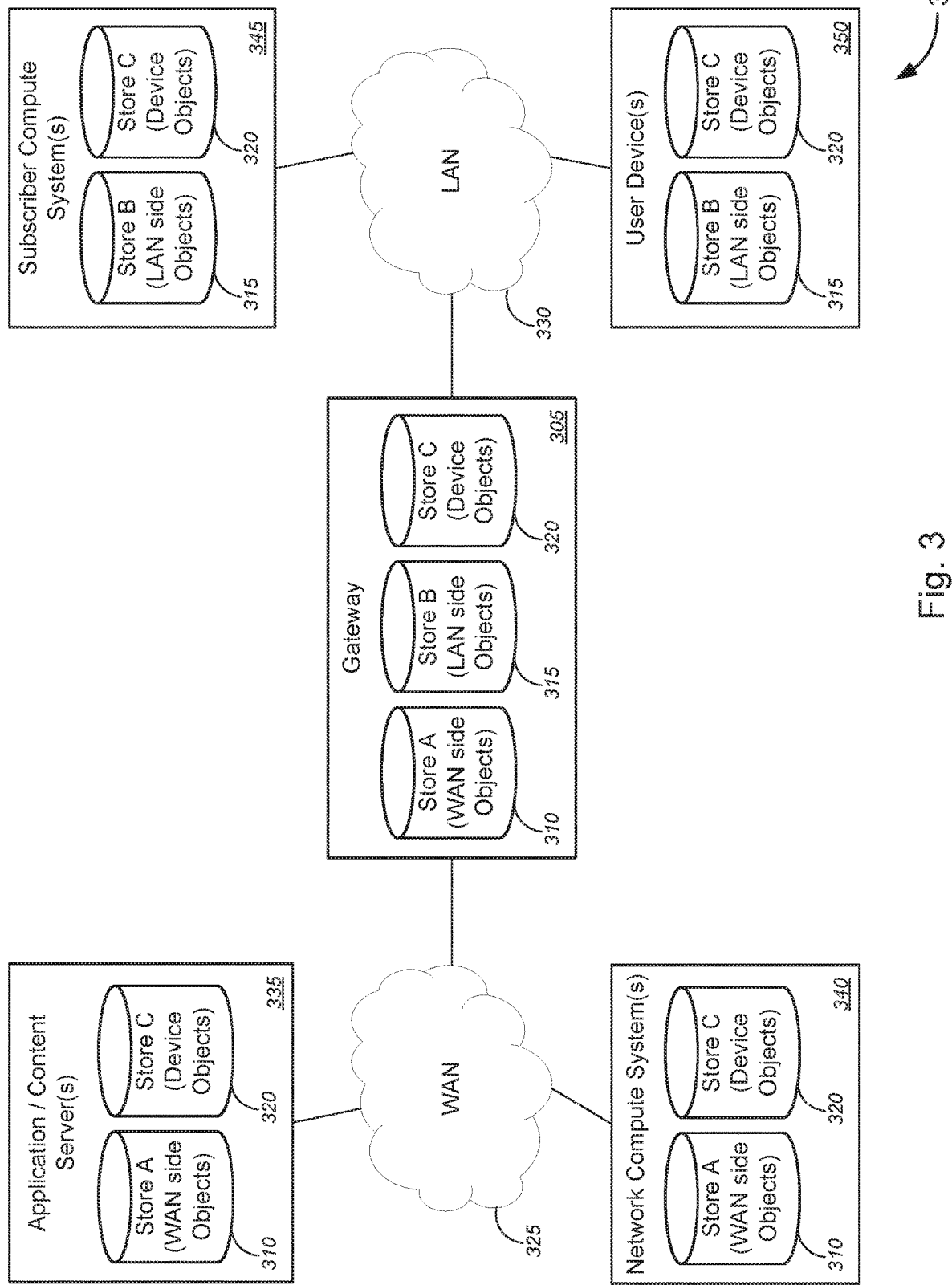
FIG. 3 is a schematic diagram illustrating another system that may be used for implementing dual network telemetry API framework and implementing API to provide network metrics and network resource control to users, in accordance with various embodiments.

FIG. 3 is a schematic diagram illustrating another system 300 that may be used for implementing dual network telemetry API framework and implementing API and/or server or gateway function to provide network metrics and network resource control to users, in accordance with various embodiments.

In the non-limiting embodiment of FIG. 3, system 300 might comprise gateway device 305, which might comprise store A 310 (which might store WAN-side shared objects), store B 315 (which might store LAN-side shared objects), and store C 320 (which might store device-based shared objects). System 300 might further comprise WAN 325 and LAN 330. System 300 might further comprise one or more application/content servers 335, one or more network compute systems 340, one or more subscriber compute systems 345, and one or more user devices 350, and/or the like. The one or more application/content servers 335 might comprise store A 310 and store C 320. The one or more network compute systems 340 might comprise store A 310 and store C 320. The one or more subscriber compute systems 345 might comprise store B 315 and store C 320. The one or more user devices 350 might comprise store B 315 and store C 320.

In some embodiments, the gateway 305, the subscriber compute system(s) 345, and the user device(s) 350 might each comprise a gateway API via which LAN side shared objects might be received from LAN 330 for storage in corresponding stores B 315 in each of the gateway 305, the subscriber compute system(s) 345, and the user device(s) 350, respectively. Similarly, the gateway 305, the application/content server(s) 335, and the network compute system(s) 340 might each comprise a network API via which WAN side shared objects might be received from WAN 325 (and in some cases, LAN 330 as well) for storage in corresponding stores A 310 in each of the gateway 305, the application/content server(s) 335, and the network compute system(s) 340, respectively.

Figure 4:
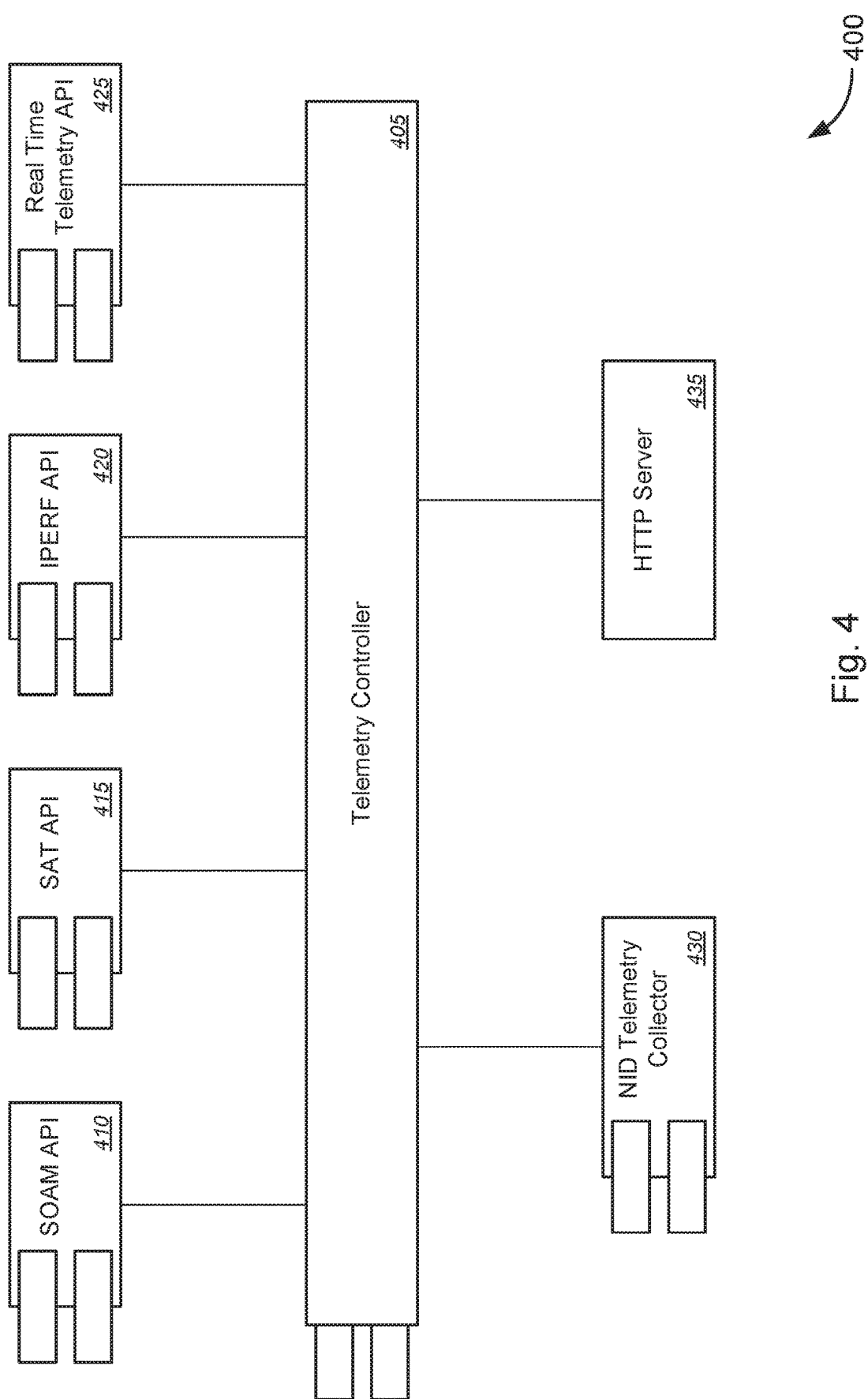
FIG. 4 is a schematic diagram illustrating a telemetry engine that may be used for implementing dual network telemetry API framework and implementing API to provide network metrics and network resource control to users, in accordance with various embodiments.

FIG. 4 is a schematic diagram illustrating a telemetry engine 400 that may be used for implementing dual network telemetry API framework and implementing API and/or server or gateway function to provide network metrics and network resource control to users, in accordance with various embodiments.

In the non-limiting embodiment of FIG. 4, system 400 might comprise telemetry controller 405, service operations, administration, and management ("Service OAM" or "SOAM") API 410, service activation testing ("SAT") API 415, Iperf network performance measurement and tuning API 420, real-time telemetry API 425, NID telemetry collector 430, and HTTP server 435.

The functionality of the set of telemetry APIs might include using a functional component design that can be implemented using micro services. A telemetry controller 405 might be responsible for the communications and coordination between supporting functional components. A set of first telemetry APIs could include the SOAM API 410, the SAT API 415, the IPERF API 420, and real-time telemetry API 425. These APIs among other APIs can be defined and built. The NID telemetry collector 430 might be responsible for accessing NID network and service specific attributes and making such attributes accessible. The HTTP server 435 might be needed to provide REST API server side functionality as well as HTTP portal access.

Figure 5:
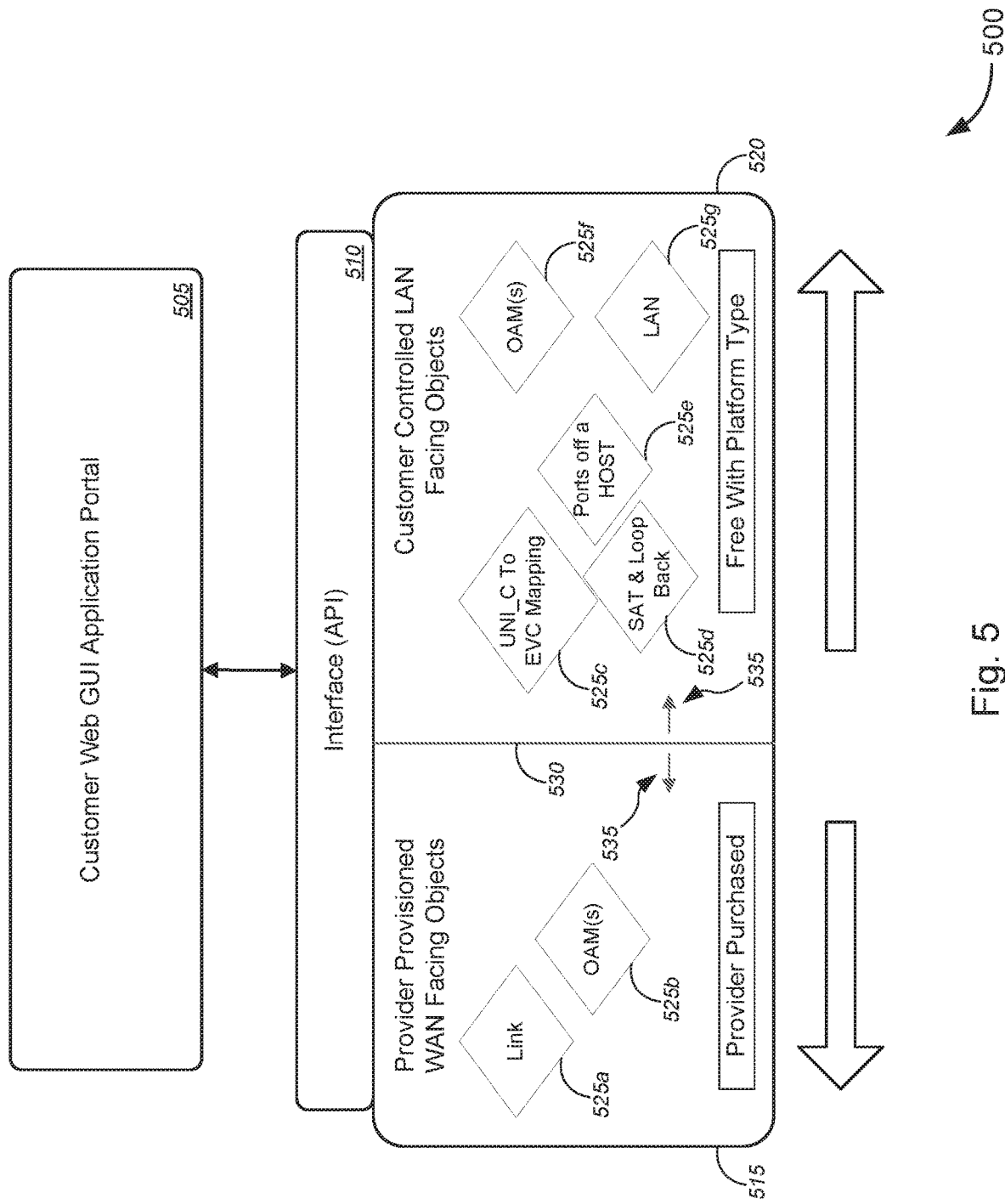
FIG. 5 is a schematic diagram illustrating yet another system that may be used for implementing dual network telemetry API framework and implementing API to provide network metrics and network resource control to users, in accordance with various embodiments.

FIG. 5 is a schematic diagram illustrating yet another system 500 that may be used for implementing dual network telemetry API framework and implementing API and/or server or gateway function to provide network metrics and network resource control to users, in accordance with various embodiments.

In the non-limiting embodiment of FIG. 5, system 500 might comprise customer web graphical user interface ("GUI") application portal 505, interface (or API) 510, provider provisioned WAN facing shared objects 515 and customer controlled LAN facing shared objects 520. System 500 might comprise link 525*a*, OAM(s) 525*b*, UNI_C to EVC Mapping 525*c*, SAT & Loop Back 525*d*, Ports off a Host 525*e*, OAM(s) 525*f*, and LAN 525*g*.

In operation, interface (and/or API) 510 might shift shared objects 525*a*, 525*b*, 525*c*, 525*d*, 525*e*, 525*f*, and 525*g* from the WAN side 515 to the LAN side 510, or vice versa, by moving line 530 WAN-side or LAN-side 535. According to some embodiments, although not specifically shown in FIG. 5, the shared objects 525 might also include, without limitation, telemetry information about one or more devices and/or information about one or more network resources either on the WAN side 515 and/or on the LAN side 510.

Figure 6:
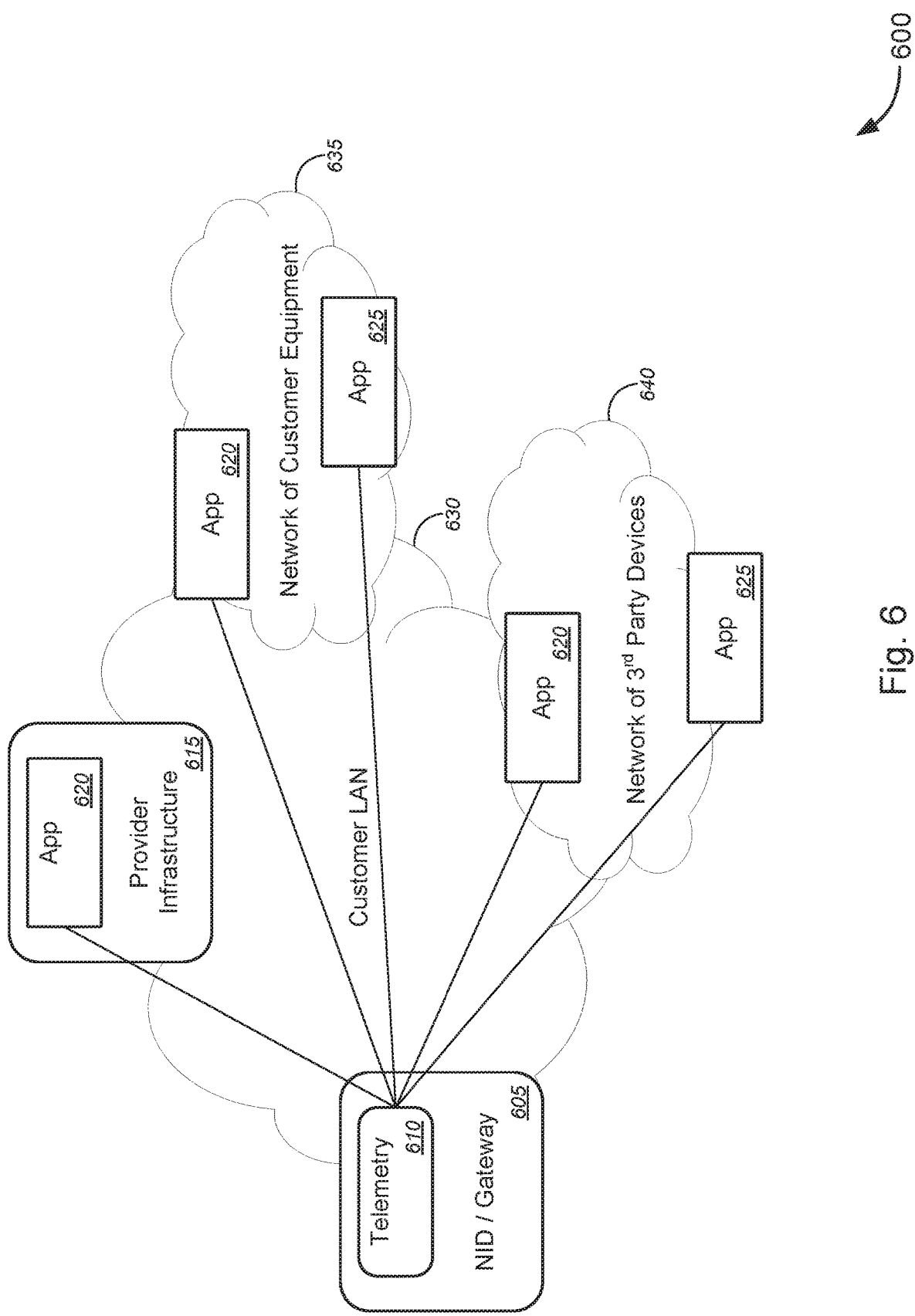
FIG. 6 is a schematic diagram illustrating another system that may be used for implementing dual network telemetry API framework and implementing API to provide network metrics and network resource control to users, in accordance with various embodiments.

FIG. 6 is a schematic diagram illustrating another system 600 that may be used for implementing dual network telemetry API framework and implementing API and/or server or gateway function to provide network metrics and network resource control to users, in accordance with various embodiments.

In the non-limited embodiment of FIG. 6, system 600 might comprise NID/gateway 605, telemetry 610, provider infrastructure 615, first apps 620, second apps 625, customer LAN 630, network of customer equipment 635, and network of third party device 640.

In some embodiments, the API service might provide telemetry on user shared objects or user managed objects that contain information on user purchased services, configurations, and their usage. Given these are customer proprietary information, the user must open the API for specific types of use, and there must be "disclose statement" information notifying the customer that they are exposing the telemetry at that specific interface. In some cases, a billing system or billing server(s) may be made available to bill users or third party members for certain telemetry data via one or more API's, in some cases in response to tracking performed by the application registry or some other tracking functionality. In some embodiments, levels of authentication may be implemented to ensure that only authorized entities can gain access to the telemetry data (via either the gateway API or the network API, or similarly via the customer network API or service provider API, or the like). With reference to FIG. 6, both non-provider and provider applications can access the API. According to some embodiments, applications hosted on the provider platform could meet the provider privacy policy and would be available via the provider application market place. Provider applications are not limited to the provider platform, however, applications that use the API may exist outside of the provider market place, and the behavior of those non-provider applications are governed only by the application coder. In some embodiments, a provider application market place might include first apps 620, which might be tested and certified to meet provider privacy compliance. Customer applications, Internet, and commercially available applications (e.g., second apps 625) have their own policy compliance statements.

Figure 7A:
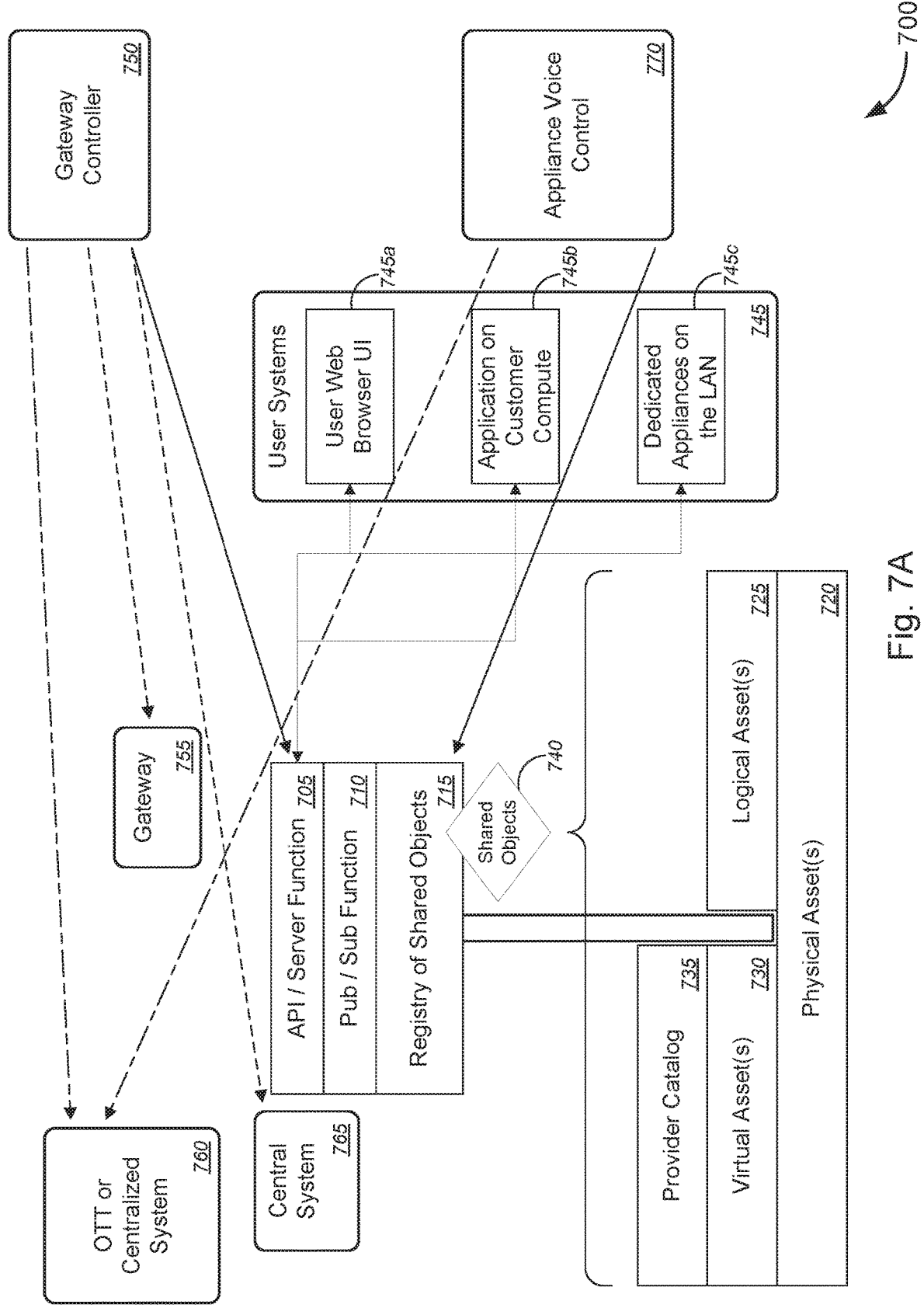
FIGS. 7A and 7B are schematic diagrams illustrating various embodiments of a system that may be used for implementing dual network telemetry API framework and implementing API to provide network metrics and network resource control to users.
Figure 7B:
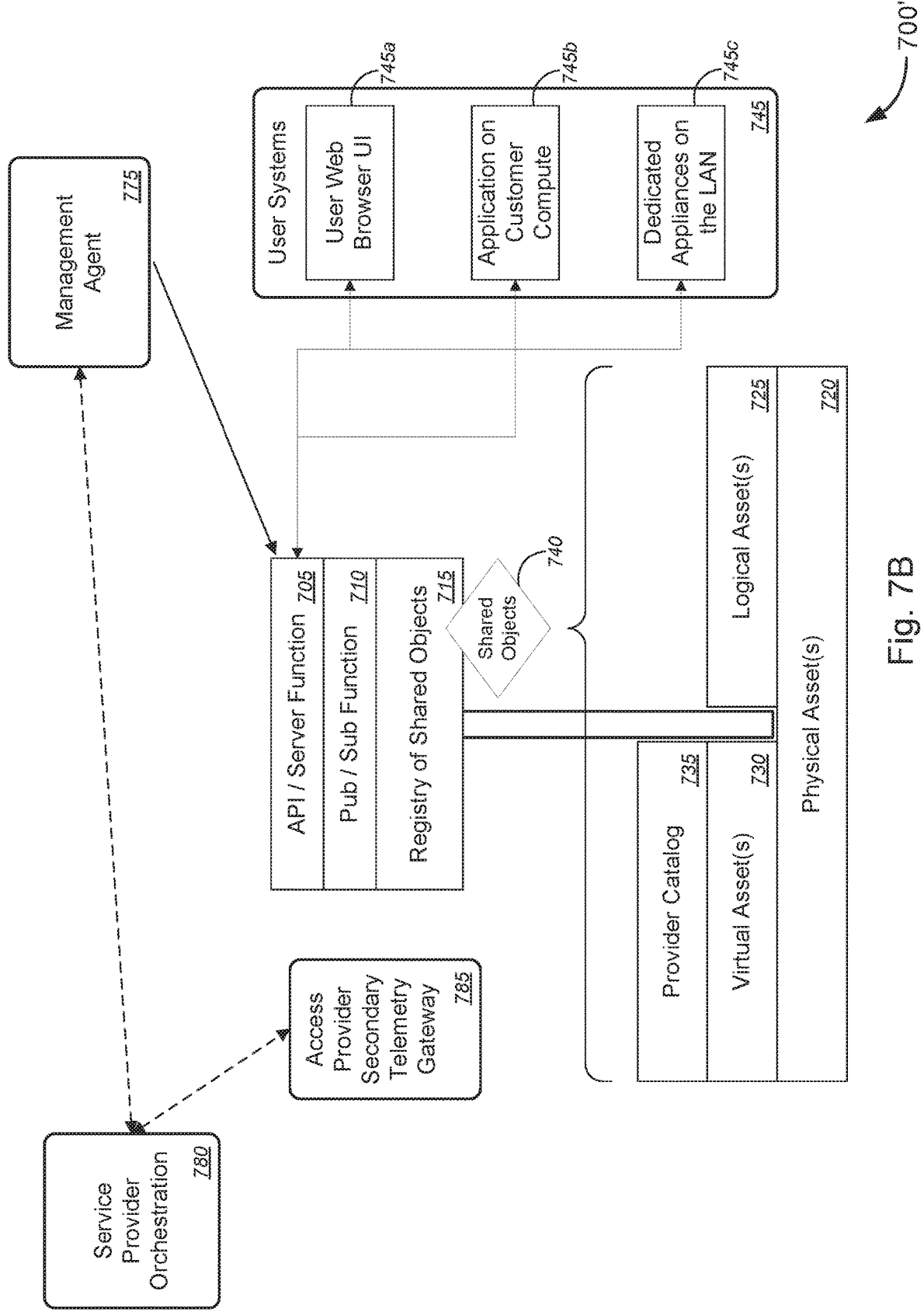

FIGS. 7A and 7B (collectively, "FIG. 7") are schematic diagrams illustrating various embodiments 700 and 700' of a system that may be used for implementing dual network telemetry API framework and implementing API and/or server or gateway function to provide network metrics and network resource control to users.

In the non-limiting embodiment of FIG. 7A, system 700 might comprise API/server function 705, publication/subscription (pub/sub) function 710, registry of shared objects 715, physical assets 720, logical assets 725, virtual assets 730, provider catalog 735, shared objects 740, user systems 745, gateway controller 750, gateway device 755, over-the-top ("OTT") or centralized system 760, central system 765, appliance voice control 770, and/or the like. The user systems 745 might comprise user web browser user interface ("UI") 745*a*, application on customer compute 745*b*, and dedicated appliances on the LAN 745*c*.

Historically, OTT and/or Internet of things ("IoT") applications, devices, and systems might only have understanding of the base connectivity which is derived from IP layer mechanisms such as ping, and congestion indications on throughput. Gateway controller functions like call admission control ("CAC") might not be in the foreign host/NID, and thus this controller engine performs those specialized functions.

In some embodiments, applications can use the shared object or managed object telemetry raw directly off the NID. Alternatively, applications can use the gateway/management agent controller to access derived indicator based on the raw telemetry. According to some embodiments, gateway, management agent, and/or controller functions might include, but are not limited to, enabling automation via a customizable machine to machine set of objects, being located locally, being located on a NID, or being located remotely, implementing big data collection from all the shared objects or managed objects (including an ability to group save different data sets for derived or charting type analysis, to collect data from IoT or other sensors, or the like), implementing dynamic or load balancing based on call admission control for applications using bandwidth, state, etc. (e.g., by creating one's own thresholds for using the access, or the like), implementing customizable derived states by using triggers/thresholds based on raw object data and big data from sensors (e.g., by creating one's own thresholds for using the access, or the like), and/or the like.

With reference to FIG. 7B, system 700' might comprise API/server function 705, publication/subscription function 710, registry of shared objects 715, physical assets 720, logical assets 725, virtual assets 730, provider catalog 735, shared objects 740, user systems 745, management agent 775, service provider orchestration 780, and access provider secondary telemetry gateway 785.

According to some embodiments, the access provider installs a service provider application on a customer premises equipment ("CPE") device to let the provider use or manage the shared objects on the access provider NID. In some embodiments, key functions of the management agent 775 might include, without limitation, boot strap function, agent proxy function, configuration information pulling function, and/or the like. In some cases, the boot strap function might call home to a service provider system to register itself and to initiate service provider configuration. This can be accomplished via use of uniform resource locator ("URL") address, pre-provisioned address, transport layer security ("TLS") encryption, tokens, and/or the like. The management agent registers the shared objects or managed objects in the NID under itself for the service provider. In some instances, the agent proxy function might contain a registry, a publication/subscription ("pub/sub") agent, and a HTTP rest agent that gathers telemetry information from the shared objects or managed objects and that enables the provider to perform pull commands, to perform push commands, and/or to subscribe to telemetry information at will. Other agent proxy functions might also include dying gasp functions (which sends out notifications indicating that it will soon lose functionality, lose power, lose connectivity, or otherwise malfunction, etc.), or the like. In some embodiments, the configuration information pulling function might include pulling configuration information from an access provider NID for a fall back telemetry interface, and sending that information to the service provider orchestration system in case the NID is unreachable.

Merely by way of example, in some aspects, the management agent 775 might include, but are not limited to, an agent registry with objects (to facilitate the boot strapping), an agent state machine (to track if the agent is reachable), a secondary telemetry gateway 785, and/or the like. In some instances, the agent state machine might track if the management agent is reachable. If the management is not reachable, the system can execute reachability tests and/or use a secondary access provider system API to relate telemetry about the unreachable access provider NID. In some cases, the secondary telemetry gateway 785 might provide telemetry and/or state information about a NID when the access NID is unreachable. This may include, without limitation, a trouble ticket state in which the service provider and the user portal can have machine to machine resolution visibility, and/or the like.

According to some embodiments, the user systems 745 in FIG. 7A or 7B (in particular, the user web browser UI 745a, the application on customer compute system 745b, or the dedicated appliances on the LAN 745c, or the like) might provide options for a user to select, for example, network resources (in some cases, embodied as the shared objects 740, or the like) that are available to the user. In some cases, the user systems 745 might list the network resource telemetry data and/or a number of attributes, data, capabilities, and statuses, and/or the like, some or all of which might be modifiable, accessible, and/or controllable by selection of such option by the user, via the user systems 745.

Merely by way of example, the user might be provided, via the user interface of the user systems 745, network metrics including, but not limited to, the user's sold network speed, the user's provisioned speed, the user's available bandwidth, the user's used bandwidth, and/or the like. The user might also be provided with options to query the user's services (which returns service names, etc.), to query the user's interfaces (which returns interfaces that the user has access to (e.g., WiFi interfaces, wired interfaces, etc.)), to query the user's port speed (e.g., to query "mywifimaxavespeed" (which returns the highest average speed), or the like), etc. Other options, as described in below with respect to FIG. 10, or the like may also be provided by the user interface.

FIGS. 8A-8G (collectively, "FIG. 8") are flow diagrams illustrating a method 800 for implementing dual network telemetry API framework, in accordance with various embodiments. Method 800 of FIG. 8A continues onto FIG. 8D following the circular marker denoted, "A," continues from FIG. 8A onto FIG. 8E following the circular marker denoted, "B," and continues from FIG. 8A onto FIG. 8F following the circular marker denoted, "C," and continues from FIG. 8A onto FIG. 8G following the circular marker denoted, "D."

While the techniques and procedures are depicted and/or described in a certain order for purposes of illustration, it should be appreciated that certain procedures may be reordered and/or omitted within the scope of various embodiments. Moreover, while the method 800 illustrated by FIG. 8 can be implemented by or with (and, in some cases, are described below with respect to) the systems 100, 200, 200', 300, 400, 500, 600, 700, and 700' of FIGS. 1, 2A, 2B, 3, 4, 5, 6, 7A, and 7B respectively (or components thereof), such methods may also be implemented using any suitable hardware (or software) implementation. Similarly, while each of the systems 100, 200, 200', 300, 400, 500, 600, 700, and 700' of FIGS. 1, 2A, 2B, 3, 4, 5, 6, 7A, and 7B, respectively (or components thereof), can operate according to the method 800 illustrated by FIG. 8 (e.g., by executing instructions embodied on a computer readable medium), the systems 100, 200, 200', 300, 400, 500, 600, 700, and 700' of FIGS. 1, 2A, 2B, 3, 4, 5, 6, 7A, and 7B can each also operate according to other modes of operation and/or perform other suitable procedures.

Figure 8A:
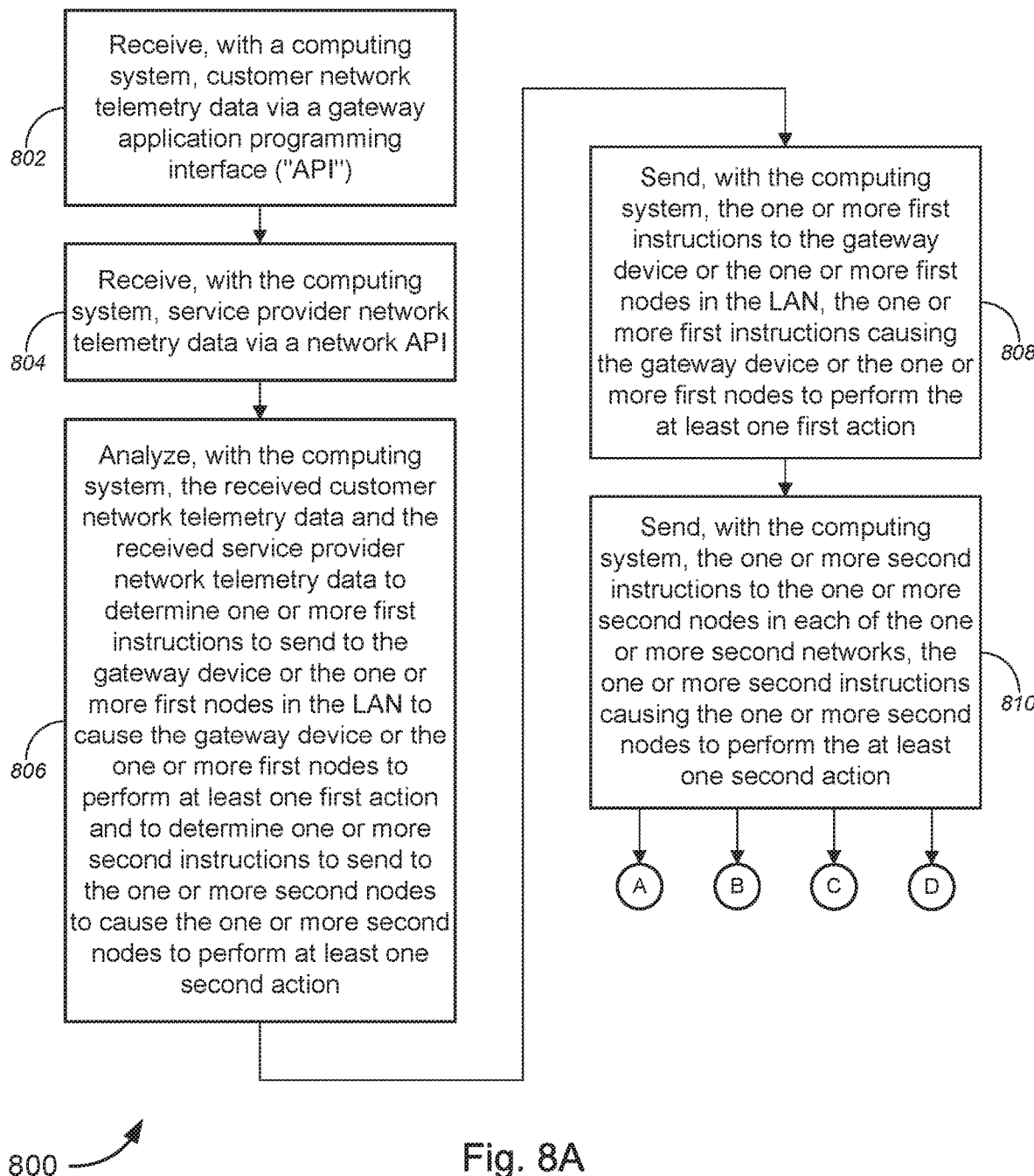

In the non-limiting embodiment of FIG. 8A, method 800, at block 802, might comprise receiving, with a computing system, customer network telemetry data via a gateway application programming interface ("API"). The customer network telemetry data might comprise information regarding a local area network ("LAN") associated with one or more user devices and information regarding a gateway device that connects the one or more user devices to one or more service provider networks (including, but not limited to, a core network, a WAN, and/or an access network of a service provider(s), or the like). In some embodiments, the computing system might include, without limitation, at least one of an API gateway, a network gateway, an access provider telemetry gateway, a residential gateway ("RG"), a business gateway ("BG"), a virtual gateway ("vG"), a network interface device ("NID"), at least one of the one or more user devices, a third party computing system, a customer computing system, an internal network-to-network interface ("INNI") system, an external network-to-network interface ("ENNI") system, a network server, a distributed computing system, or a cloud computing system, and/or the like. In some cases, in response to a determination that the gateway device has become unreachable, the access provider telemetry gateway might send telemetry and state information regarding the gateway device to the computing system, the access provider telemetry gateway being separate from the gateway device. According to some embodiments, the gateway device might include, but is not limited to, at least one of an API gateway, a network gateway, an access provider telemetry gateway, a residential gateway ("RG"), a business gateway ("BG"), a virtual gateway ("vG"), or a network interface device ("NID"), and/or the like.

At block 804, method 800 might comprise receiving, with the computing system, service provider network telemetry data via a network API. The service provider network telemetry data might comprise information regarding one or more communications links along at least portions of one or more networks between the one or more user devices and the core network via the gateway device or regarding one or more communications links between the LAN and a WAN. In some instances, the information regarding one or more communications links along the at least portions of the one or more networks between the one or more user devices and the core network via the gateway device (or regarding one or more communications links between the LAN and the WAN) might include, without limitation, at least one of telemetry data regarding one or more communications links between the one or more user devices and the gateway device, telemetry data regarding one or more communications links between the gateway device and an edge router disposed between an access network and a core network, telemetry data regarding network equipment connected by the one or more communications links between the gateway device and the edge router, telemetry data regarding the edge router, telemetry data regarding one or more communications links between the gateway device and one or more network elements disposed in the access network, telemetry data regarding network equipment connected by the one or more communications links between the gateway device and the one or more network elements, telemetry data regarding the one or more network elements, telemetry data regarding one or more communications links in one or more networks (e.g., WAN or other network, or the like), telemetry data regarding network elements in the WAN connected by the one or more communications links in the WAN, telemetry data regarding one or more communications links on a communications path between one or more devices in the LAN and one or more network nodes in the WAN obtainable via the gateway device, telemetry data regarding one or more communications links on a communications path between one or more devices in the LAN and one or more network nodes in the WAN obtainable via the gateway device, or end-to-end ("E2E") telemetry data regarding one or more communications links between the one or more user devices and the core network via the gateway device, and/or the like.

In some embodiments, the customer network telemetry data and the service provider network telemetry data might each include, without limitation, at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices, and/or the like.

According to some embodiments, at least one of the gateway device or the one or more first nodes in LAN might identify one or more first shared objects in the LAN and might broadcast to other nodes an indication that the one or more first shared objects are available to be shared. The one or more first shared objects might each be an abstraction of at least one of information or one or more resources that exist in the LAN. The one or more resources might comprise at least one of physical network resources, logical network resources, virtual resources, or application layer resources, and/or the like.

In some embodiments, at least one of the one or more second nodes might identify one or more second shared objects along the one or more communications links and might broadcast to other nodes an indication that the one or more second shared objects are available to be shared. The one or more second shared objects might each be an abstraction of at least one of information or one or more resources that exist along the one or more communications links. The one or more resources might comprise at least one of physical network resources, logical network resources, virtual resources, or application layer resources, and/or the like.

Method 800 might further comprise analyzing, with the computing system, the received customer network telemetry data and the received service provider network telemetry data to determine one or more first instructions to send to the gateway device or the one or more first nodes in the LAN to cause the gateway device or the one or more first nodes to perform at least one first action and to determine one or more second instructions to send to the one or more second nodes in each of the one or more second networks to cause the one or more second nodes to perform at least one second action (block 806).

Method 800, at block 808, might comprise sending, with the computing system, the one or more first instructions to the gateway device or the one or more first nodes in the LAN, the one or more first instructions causing the gateway device or the one or more first nodes to perform the at least one first action.

Method 800 might further comprise, at block 810, sending, with the computing system, the one or more second instructions to the one or more second nodes in each of the one or more second networks, the one or more second instructions causing the one or more second nodes to perform the at least one second action. The process at block 810 might continue onto FIGS. 8D, 8E, 8F, and 8G, following circular markers denoted, "A," "B," "C," and "D," respectively.

Figure 8B:
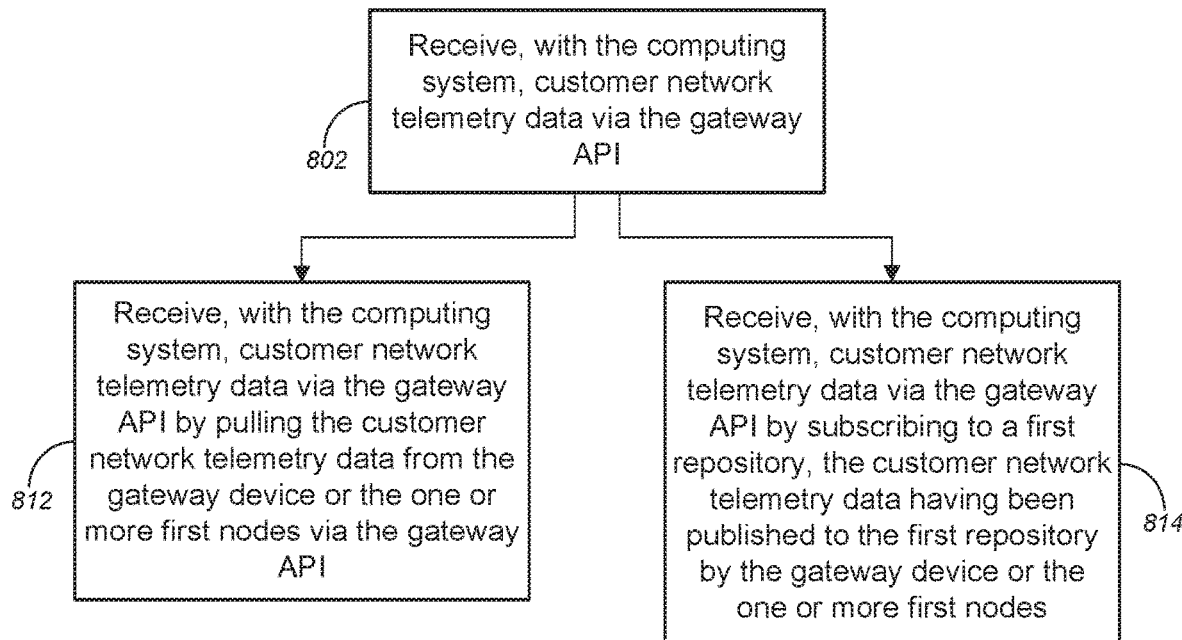

With reference to FIG. 8B, receiving, with the computing system, customer network telemetry data via the gateway API (at block 802) might comprise either receiving, with the computing system, customer network telemetry data via the gateway API by pulling the customer network telemetry data from the gateway device or the one or more first nodes via the gateway API (block 812) and/or receiving, with the computing system, customer network telemetry data via the gateway API by subscribing to a first repository, the customer network telemetry data having been published to the first repository by the gateway device or the one or more first nodes (block 814).

Figure 8C:
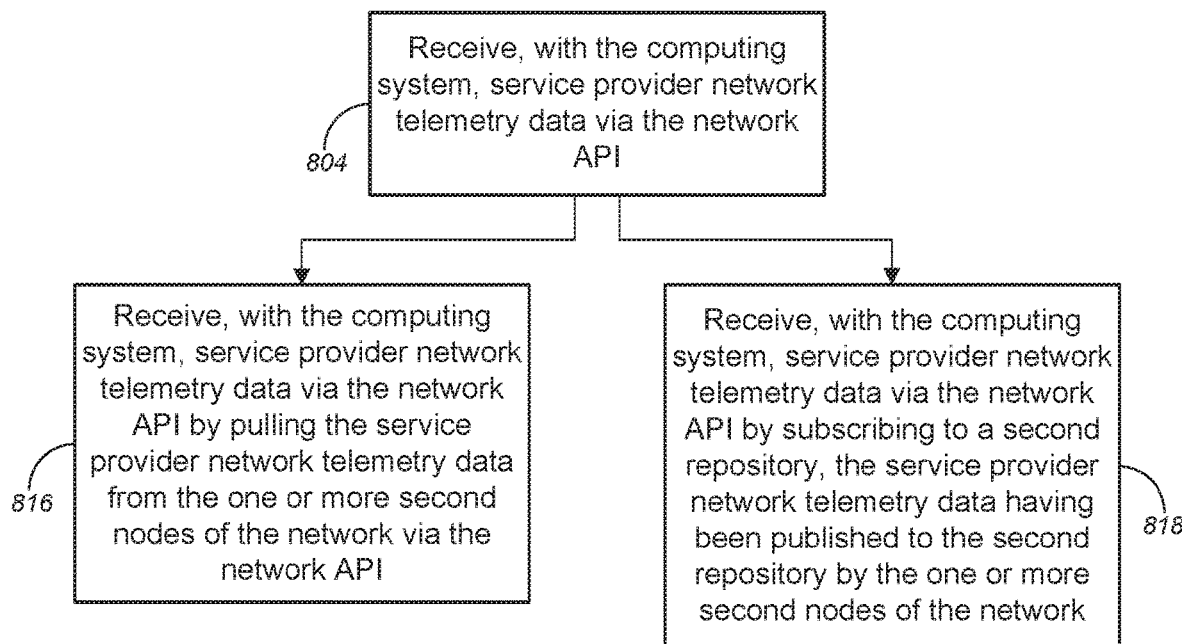

Turning to FIG. 8C, receiving, with the computing system, service provider network telemetry data via the network API (at block 804) might comprise either receiving, with the computing system, service provider network telemetry data via the network API by pulling the service provider network telemetry data from the one or more second nodes of the network via the network API (block 816) and/or receiving, with the computing system, service provider network telemetry data via the network API by subscribing to a second repository, the service provider network telemetry data having been published to the second repository by the one or more second nodes of the network (block 818). In some cases, the first repository and the second repository are the same repository.

In FIG. 8D, following circular marker, "A," from block 810, method 800 might comprise determining, with the computing system, whether any of the gateway device, the one or more first nodes in the LAN, or the one or more second nodes along the one or more communications links are telecommunications equipment that are capable of supporting network functions virtualization ("NFV") (block 820); and based on a determination that an identified one or more of the gateway device, the one or more first nodes in the LAN, or the one or more second nodes along the one or more communications links are telecommunications equipment that are capable of supporting NFV, instantiating a virtualized network function ("VNF") in each of the telecommunications equipment and configuring each VNF to provide at least one of service provider network telemetry data or telemetry data of the telecommunications equipment to the computing system (block 822).

In FIG. 8E, following circular marker, "B," from block 810, method 800 might comprise receiving, with at least one of the computing system or the gateway device, a request from a user to use network functions virtualization infrastructure ("NFVI") resources capable of supporting a VNF that is configured to collect, generate, and provide telemetry information (block 824) and identifying, with the at least one of the computing system or the gateway device, which of at least one of the gateway device, the one or more first nodes, or the one or more second nodes is able to handle the request (block 826). In some embodiments, identifying which of at least one of the gateway device, the one or more first nodes, or the one or more second nodes is able to handle the request might comprise using a registry of shared objects to identify the requested NFVI resources and to identify the network equipment hosting the NFVI resources (block 828). The shared objects are each an abstraction of at least one of information or one or more resources that exist in at least one of the LAN or one or more networks along the one or more communications links. Method 800 might further comprise, at block 830, redirecting, with the at least one of the computing system or the gateway device, the request to the identified at least one of the gateway device, the one or more first nodes, or the one or more second nodes to provide the user with access to the NFVI resources.

In FIG. 8F, following circular marker, "C," from block 810, method 800 might further comprise analyzing, with the computing system, the received first network telemetry data and the received second network telemetry data to determine how to optimize the LAN and to determine how to optimize the one or more communications links between the one or more user devices and the core network via the gateway device (or how to optimize at least one of the WAN or the one or more communications between the LAN and the WAN) (block 832). Method 800, at block 834, might comprise sending, with the computing system, at least one first configuration file to at least one of the gateway device or the one or more first nodes in the LAN, the at least one first configuration file enabling optimization of the LAN. Method 800 might further comprise, at block 836, sending, with the computing system, at least one second configuration file to at least one second node of the one or more second nodes, the at least one second node being disposed along the one or more communications links between the one or more user devices and the core network via the gateway device (or disposed along the one or more communications links between the LAN and the WAN), the at least one second configuration file enabling optimization of at least one of the one or more communications links or the WAN.

In FIG. 8G, following circular marker, "D," from block 810, method 800 might comprise compiling, with the computing system and from the received customer network telemetry data and the received service provider network telemetry data, customer network telemetry data and service provider network telemetry data that are associated with a particular user (block 838); updating, with the computing system, a user interface that is associated with the user with the compiled customer network telemetry data and service provider network telemetry data that are associated with the particular user (block 840); providing, with the user interface, information regarding shared objects that are available for use by the particular user (block 842); and providing, with the user interface, the particular user with access control to the shared objects (block 844). According to some embodiments, the user interface might comprise at least one of a customer web portal, a software application ("app") user interface, or a dedicated customer API user interface, and/or the like.

FIGS. 9A-9G (collectively, "FIG. 9") are flow diagrams illustrating a method 900 for implementing dual network telemetry API framework, in accordance with various embodiments. Method 900 of FIG. 9A continues onto FIG. 9D following the circular marker denoted, "A," continues from FIG. 9A onto FIG. 9E following the circular marker denoted, "B," and continues from FIG. 9A onto FIG. 9F following the circular marker denoted, "C," and continues from FIG. 9A onto FIG. 9G following the circular marker denoted, "D."

While the techniques and procedures are depicted and/or described in a certain order for purposes of illustration, it should be appreciated that certain procedures may be reordered and/or omitted within the scope of various embodiments. Moreover, while the method 900 illustrated by FIG. 9 can be implemented by or with (and, in some cases, are described below with respect to) the systems 100, 200, 200', 300, 400, 500, 600, 700, and 700' of FIGS. 1, 2A, 2B, 3, 4, 5, 6, 7A, and 7B respectively (or components thereof), such methods may also be implemented using any suitable hardware (or software) implementation. Similarly, while each of the systems 100, 200, 200', 300, 400, 500, 600, 700, and 700' of FIGS. 1, 2A, 2B, 3, 4, 5, 6, 7A, and 7B, respectively (or components thereof), can operate according to the method 900 illustrated by FIG. 9 (e.g., by executing instructions embodied on a computer readable medium), the systems 100, 200, 200', 300, 400, 500, 600, 700, and 700' of FIGS. 1, 2A, 2B, 3, 4, 5, 6, 7A, and 7B can each also operate according to other modes of operation and/or perform other suitable procedures.

Figure 9A:
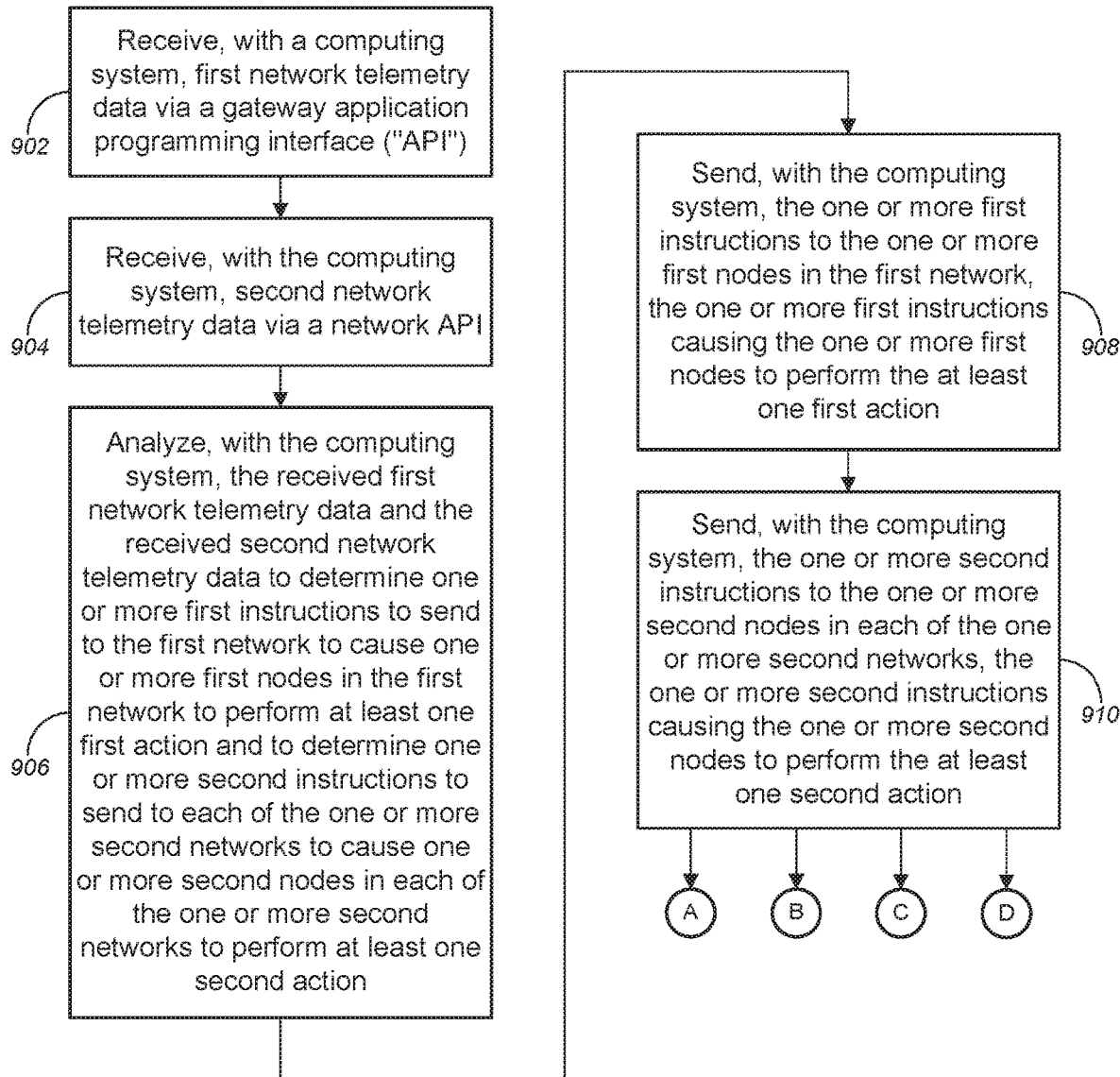

In the non-limiting embodiment of FIG. 9A, method 900, at block 902, might comprise receiving, with a computing system, first network telemetry data via a gateway application programming interface ("API"). The first network telemetry data might comprise information regarding a first network.

At block 904, method 900 might comprise receiving, with the computing system, second network telemetry data via a network API. The second network telemetry data might comprise information regarding one or more second networks.

Method 900 might further comprise analyzing, with the computing system, the received first network telemetry data and the received second network telemetry data to determine one or more first instructions to send to the first network to cause one or more first nodes in the first network to perform at least one first action and to determine one or more second instructions to send to each of the one or more second networks to cause one or more second nodes in each of the one or more second networks to perform at least one second action (block 906).

Method 900, at block 908, might comprise sending, with the computing system, the one or more first instructions to the one or more first nodes in the first network, the one or more first instructions causing the one or more first nodes to perform the at least one first action.

Method 900 might further comprise, at block 910, sending, with the computing system, the one or more second instructions to the one or more second nodes in each of the one or more second networks, the one or more second instructions causing the one or more second nodes to perform the at least one second action. The process at block 910 might continue onto FIGS. 9D, 9E, 9F, and 9G, following circular markers denoted, "A," "B," "C," and "D," respectively.

According to some embodiments, the first network telemetry data might comprise customer network telemetry data and the first network might comprise a local area network ("LAN"), the customer network telemetry data comprising information regarding the LAN and information regarding a gateway device that connects one or more user devices in the LAN to a core network of a service provider. In some cases, the second network telemetry data might comprise service provider network telemetry data and the one or more second networks might comprise one or more service provider networks, the service provider network telemetry data comprising information regarding one or more communications links along at least portions of the one or more service provider networks between the one or more user devices and the core network via the gateway device In some embodiments, the computing system might include, without limitation, at least one of an API gateway, a network gateway, an access provider telemetry gateway, a residential gateway ("RG"), a business gateway ("BG"), a virtual gateway ("vG"), a network interface device ("NID"), at least one of the one or more user devices, a third party computing system, a customer computing system, an internal network-to-network interface ("INNI") system, an external network-to-network interface ("ENNI") system, a network server, a distributed computing system, or a cloud computing system, and/or the like. In some cases, in response to a determination that the gateway device has become unreachable, an access provider telemetry gateway might send telemetry and state information regarding the gateway device to the computing system, the access provider telemetry gateway being separate from the gateway device. According to some embodiments, the gateway device might include, but is not limited to, at least one of an API gateway, a network gateway, an access provider telemetry gateway, a residential gateway ("RG"), a business gateway ("BG"), a virtual gateway ("vG"), or a network interface device ("NID"), and/or the like.

In some instances, the information regarding one or more communications links along the at least portions of the one or more service provider networks between the one or more user devices and the core network via the gateway device or the information regarding the one or more second networks might include, without limitation, at least one of telemetry data regarding one or more communications links between the one or more user devices and the gateway device, telemetry data regarding one or more communications links between the gateway device and an edge router disposed between an access network and the core network, telemetry data regarding network equipment connected by the one or more communications links between the gateway device and the edge router, telemetry data regarding the edge router, telemetry data regarding one or more communications links between the gateway device and one or more network elements disposed in the access network, telemetry data regarding network equipment connected by the one or more communications links between the gateway device and the one or more network elements, telemetry data regarding the one or more network elements, telemetry data regarding one or more communications links in one or more networks (e.g., WAN or other network, or the like), telemetry data regarding network elements in the WAN connected by the one or more communications links in the WAN, telemetry data regarding one or more communications links on a communications path between one or more devices in the LAN and one or more network nodes in the WAN obtainable via the gateway device, telemetry data regarding one or more communications links on a communications path between one or more devices in the LAN and one or more network nodes in the WAN obtainable via the gateway device, or end-to-end ("E2E") telemetry data regarding one or more communications links between the one or more user devices and the core network via the gateway device, and/or the like.

According to some embodiments, at least one of the gateway device or the one or more first nodes in LAN might identify one or more first shared objects in the LAN and might broadcast to other nodes an indication that the one or more first shared objects are available to be shared. The one or more first shared objects might each be an abstraction of at least one of information or one or more resources that exist in the LAN. The one or more resources might comprise at least one of physical network resources, logical network resources, virtual resources, or application layer resources, and/or the like.

In some embodiments, at least one of the one or more second nodes might identify one or more second shared objects along the one or more communications links and might broadcast to other nodes an indication that the one or more second shared objects are available to be shared. The one or more second shared objects might each be an abstraction of at least one of information or one or more resources that exist along the one or more communications links. The one or more resources might comprise at least one of physical network resources, logical network resources, virtual resources, or application layer resources, and/or the like.

In some embodiments, the first network telemetry data and the second network telemetry data might each include, without limitation, at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices, and/or the like.

Figure 9B:
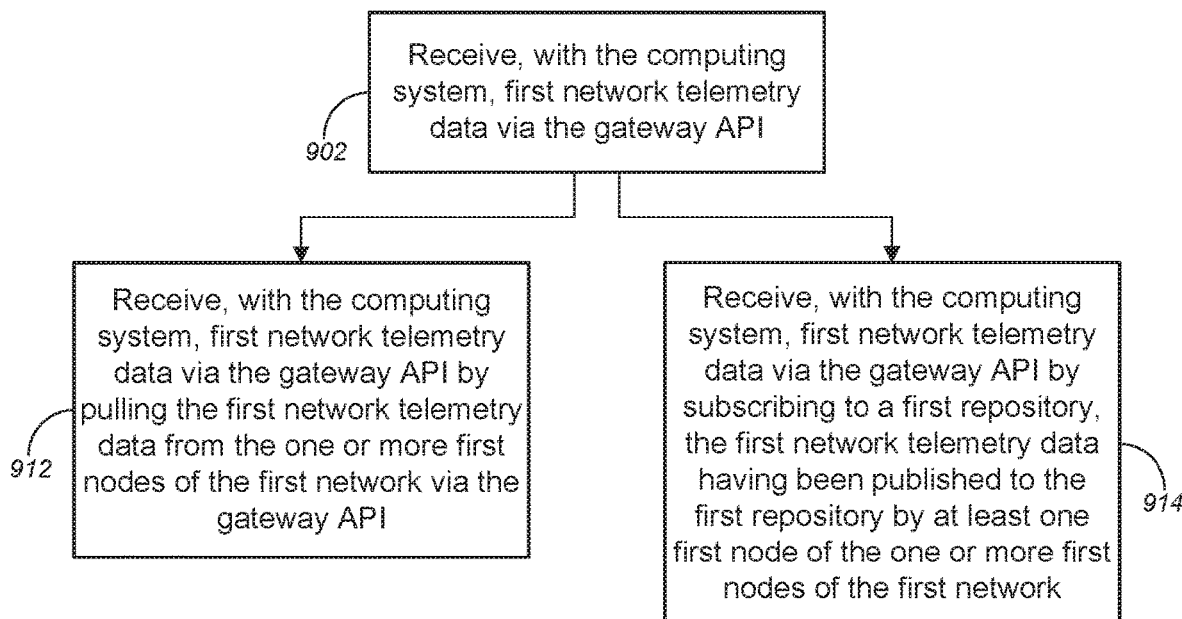

With reference to FIG. 9B, receiving, with the computing system, first network telemetry data via the gateway API (at block 902) might comprise either receiving, with the computing system, first network telemetry data via the gateway API by pulling the first network telemetry data from the one or more first nodes of the first network via the gateway API (block 912) and/or receiving, with the computing system, first network telemetry data via the gateway API by subscribing to a first repository, the first network telemetry data having been published to the first repository by at least one first node of the one or more first nodes of the first network (block 914).

Figure 9C:
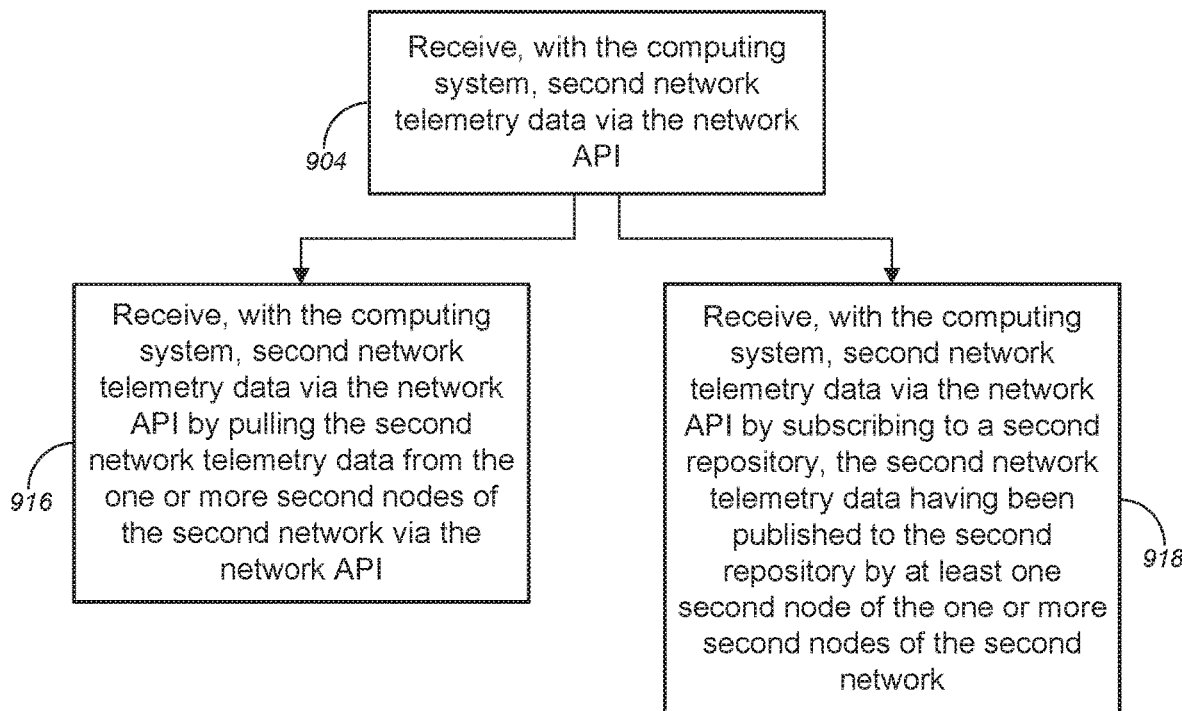

Turning to FIG. 9C, receiving, with the computing system, second network telemetry data via the network API (at block 904) might comprise either receiving, with the computing system, second network telemetry data via the network API by pulling the second network telemetry data from the one or more second nodes of the second network via the network API (block 916) and/or receiving, with the computing system, second network telemetry data via the network API by subscribing to a second repository, the second network telemetry data having been published to the second repository by at least one second node of the one or more second nodes of the second network (block 918). In some cases, the first repository and the second repository are the same repository.

In FIG. 9D, following circular marker, "A," from block 910, method 900 might comprise determining, with the computing system, whether any of the gateway device, the one or more first nodes in the LAN, or the one or more second nodes along the one or more communications links are telecommunications equipment that are capable of supporting network functions virtualization ("NFV") (block 920); and based on a determination that an identified one or more of the gateway device, the one or more first nodes in the LAN, or the one or more second nodes along the one or more communications links are telecommunications equipment that are capable of supporting NFV, instantiating a virtualized network function ("VNF") in each of the telecommunications equipment and configuring each VNF to provide at least one of service provider network telemetry data or telemetry data of the telecommunications equipment to the computing system (block 922).

In FIG. 9E, following circular marker, "B," from block 910, method 900 might comprise receiving, with the computing system, a request from a user to use network functions virtualization infrastructure ("NFVI") resources capable of supporting a VNF that is configured to collect, generate, and provide telemetry information (block 924) and identifying, with the computing system, which of at least one of the one or more first nodes or the one or more second nodes is able to handle the request (block 926). In some embodiments, identifying which of at least one of the one or more first nodes or the one or more second nodes is able to handle the request might comprise using a registry of shared objects to identify the requested NFVI resources and to identify the network equipment hosting the NFVI resources (block 928). The shared objects are each an abstraction of at least one of information or one or more resources that exist in at least one of the LAN or one or more networks along the one or more communications links. Method 900 might further comprise, at block 930, redirecting, with the computing system, the request to the identified at least one of the one or more first nodes or the one or more second nodes to provide the user with access to the NFVI resources.

In FIG. 9F, following circular marker, "C," from block 910, method 900 might further comprise analyzing, with the computing system, the received first network telemetry data and the received second network telemetry data to determine how to optimize the LAN and to determine how to optimize the one or more communications links between the one or more user devices and the core network via the gateway device (block 932). Method 900, at block 934, might comprise sending, with the computing system, at least one first configuration file to at least one of the gateway device or the one or more first nodes in the LAN, the at least one first configuration file enabling optimization of the LAN. Method 900 might further comprise, at block 936, sending, with the computing system, at least one second configuration file to at least one second node of the one or more second nodes, the at least one second node being disposed along the one or more communications links between the one or more user devices and the core network via the gateway device, the at least one second configuration file enabling optimization of the one or more communications links.

In FIG. 9G, following circular marker, "D," from block 910, method 900 might comprise compiling, with the computing system and from the received first network telemetry data and the received second network telemetry data, third network telemetry data and fourth network telemetry data that are associated with a particular user (block 938); updating, with the computing system, a user interface that is associated with the user with the compiled third network telemetry data and fourth network telemetry data that are associated with the particular user (block 940); providing, with the user interface, information regarding shared objects that are available for use by the particular user (block 942); and providing, with the user interface, the particular user with access control to the shared objects (block 944). According to some embodiments, the user interface might comprise at least one of a customer web portal, a software application ("app") user interface, or a dedicated customer API user interface, and/or the like.

Figure 10:
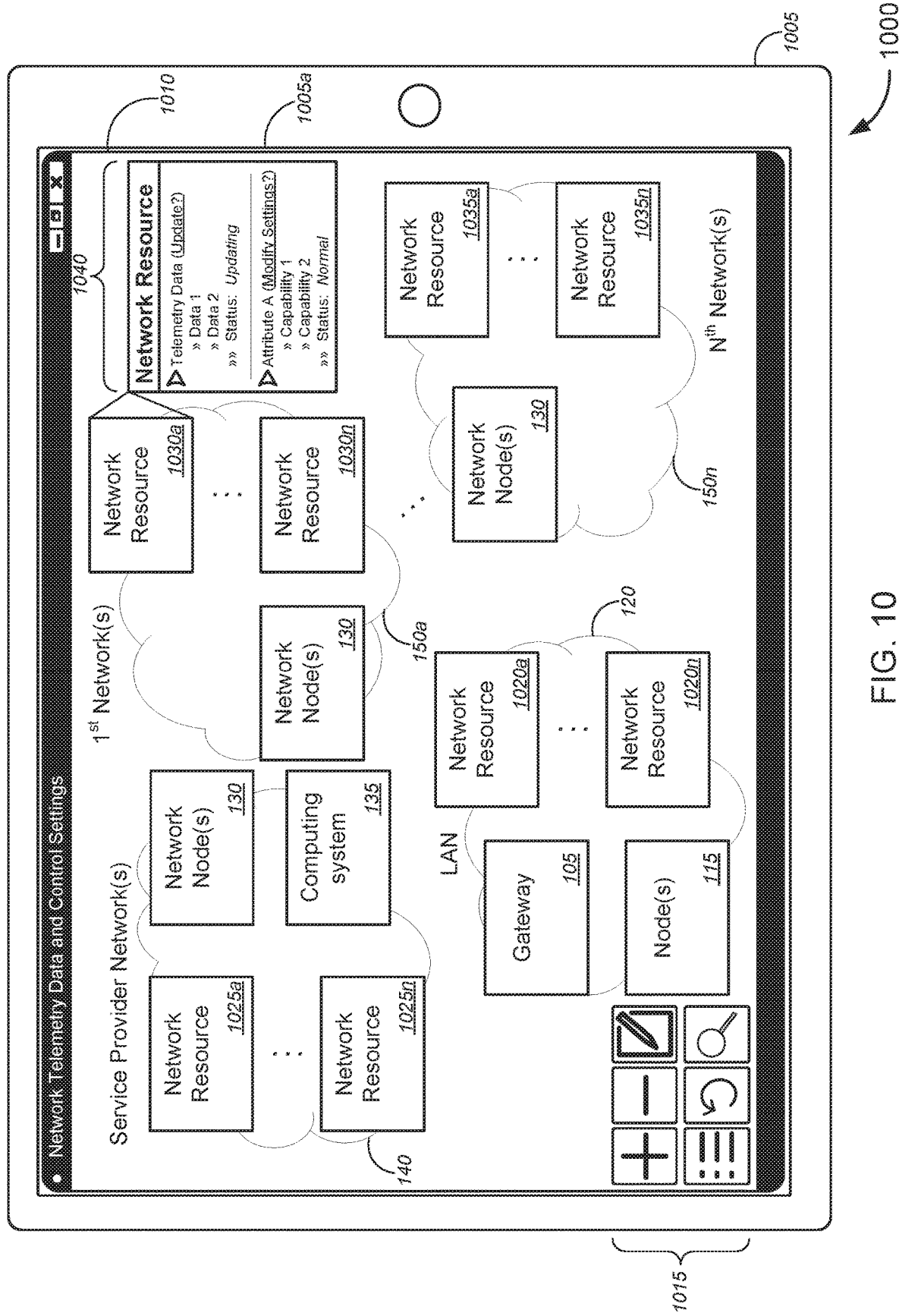
FIG. 10 is an exemplary illustration of a user device used by users that present graphical user interfaces configured for providing options for users to access network telemetry data and control settings when API is implemented to provide network metrics and network resource control to users, in accordance with various embodiments.

FIG. 10 is an exemplary illustration of a user device used by users that present graphical user interfaces configured for providing options for users to access network telemetry data and control settings when API and/or server or gateway function is implemented to provide network metrics and network resource control to users, in accordance with various embodiments.

The embodiment as represented in FIG. 10 is merely illustrative and is not intended to limit the scope of the various embodiments. For example, although the graphical user interface of FIG. 10 depicts a line-by-line or line-to-line type GUI, various embodiments may employ a drag-and-drop type GUI (not shown) that allows for more intuitive graphical interaction between the user and the icons representing user devices, network devices, hardware resources, network resources, networks, attributes, capabilities, states, and/or the like.

In FIG. 10, although a tablet computer is shown as the user device 1000, any suitable user device—including, but not limited to, any of user devices 110a-110n, 350, and 745 of FIGS. 1, 3, and 7, which might include, without limitation, at least one of a tablet computer, a smart phone, a mobile phone, a personal digital assistant, a desktop computer, a television, a set-top box, a gaming console, a portable gaming device, and/or the like.

As shown in the embodiment of FIG. 10, user device 1000 might comprise a device housing 1005 and a display 1005a (which may be a touchscreen display or a non-touchscreen display). An app, an application window, program window or portal (e.g., web portal or the like) may be displayed on the display 1005a. In the non-limiting example of FIG. 10, the app or portal 1010 running on the user device 1000 is a user interface, although the various embodiments are not limited to such an app or portal, as described herein, and can be any suitable app or portal. The app or portal 1010 displayed in display 1005a might provide a user with the ability, functionality, or options to map and modify network resources across multiple (disparate) networks that may be operated or owned by multiple different entities (e.g., in the case of a hybrid cloud system, in which the user's (or company's) private cloud system might be used in conjunction with one or more public cloud systems owned or operated by one or more cloud service providers, or the like).

The app or portal 1010 might also display control icons or buttons 1015, including buttons (typically, soft buttons or the like) for adding/registering new user devices, new hardware/network resources, new third party servers or nodes, new networks (including third party networks), etc.; for removing/de-registering user devices, hardware/network resources, third party servers or nodes, networks, etc.; for editing or mapping access, configuration, control, and/or network options for particular or selected user devices, hardware/network resources, third party servers or nodes, networks, and/or the like; for accessing menu options; for undoing changes; for searching for particular user devices, hardware/network resources, third party servers or nodes, networks, etc.; and/or the like.

In the non-limiting embodiment of FIG. 10, selecting or highlighting particular user devices, hardware/network resources, third party servers or nodes, networks 120, 140, and 150a-150n, etc. might display a pop-up window or panel that provides access, configuration, or network options for the selected or highlighted particular user devices, hardware/network resources, third party servers or nodes, networks, etc. For example, as shown in the user interface 1010 of FIG. 10, the system components of a network system (e.g., similar to system 100 of FIG. 1 or the like) might be displayed. For instance, the network system of FIG. 10 might include, without limitation, a gateway device 105, node(s) 115, and network resources 1020a-1020n (collectively, "network resources 1020" or the like) disposed in local area network ("LAN") 120, network node(s) 130, computing system 135, and network resources 1025a-1025n (collectively, "network resources 1025" or the like) disposed in service provider network(s) 140, network node(s) 130 and network resources 1030a-1030n (collectively, "network resources 1030" or the like) disposed in one or more first network(s) 150a, and network node(s) 130 and network resources 1035a-1035n (collectively, "network resources 1035" or the like) disposed in one or more $N^{th}$ network(s) 150n, and so on.

The non-limiting embodiments of the user interface of FIG. 10 might provide options for a user to select, for example, network resources 1020, 1025, 1030, and/or 1035, and might result in pop-up window or panel 1040 being displayed. In some cases, pop-up window or panel 1040 might list the network resource 1030a telemetry data and/or a number of attributes (e.g., attributes A in FIG. 10, or the like), data (e.g., data 1 and 2 of telemetry data in FIG. 10, or the like), capabilities (e.g., capabilities 1 and 2 of attribute A, etc. in FIG. 10, or the like), and statuses (e.g., status of updating with respect to telemetry data in FIG. 10, status of normal with respect to attribute A, etc. in FIG. 10, or the like), and/or the like, some or all of which might be modifiable, accessible, and/or controllable by selection of such option by the user.

Merely by way of example, the user might be provided, via the user interface, network metrics including, but not limited to, the user's sold network speed, the user's provisioned speed, the user's available bandwidth, the user's used bandwidth, and/or the like. The user might also be provided with options to query the user's services (which returns service names, etc.), to query the user's interfaces (which returns interfaces that the user has access to (e.g., WiFi interfaces, wired interfaces, etc.)), to query the user's port speed (e.g., to query "mywifimaxavespeed" (which returns the highest average speed), or the like), etc. Other options, as described in detail above with respect to FIGS. 1-9, or the like may also be provided by the user interface.

FIGS. 11A-11F (collectively, "FIG. 11") are flow diagrams illustrating a method 1100 for implementing API and/or server or gateway function to provide network metrics and network resource control to users, in accordance with various embodiments. Method 1100 of FIG. 11A continues onto FIG. 11D following the circular marker denoted, "A," continues from FIG. 11A onto FIG. 11E following the circular marker denoted, "B," and continues from FIG. 11A onto FIG. 11F following the circular marker denoted, "C."

While the techniques and procedures are depicted and/or described in a certain order for purposes of illustration, it should be appreciated that certain procedures may be reordered and/or omitted within the scope of various embodiments. Moreover, while the method 1100 illustrated by FIG. 11 can be implemented by or with (and, in some cases, are described below with respect to) the systems 100, 200, 200', 300, 400, 500, 600, 700, 700', and 10 of FIGS. 1, 2A, 2B, 3, 4, 5, 6, 7A, 7B, and 10 respectively (or components thereof), such methods may also be implemented using any suitable hardware (or software) implementation. Similarly, while each of the systems 100, 200, 200', 300, 400, 500, 600, 700, 700', and 10 of FIGS. 1, 2A, 2B, 3, 4, 5, 6, 7A, 7B, and 10, respectively (or components thereof), can operate according to the method 1100 illustrated by FIG. 11 (e.g., by executing instructions embodied on a computer readable medium), the systems 100, 200, 200', 300, 400, 500, 600, 700, 700', and 10 of FIGS. 1, 2A, 2B, 3, 4, 5, 6, 7A, 7B, and 10 can each also operate according to other modes of operation and/or perform other suitable procedures.

Figure 11A:
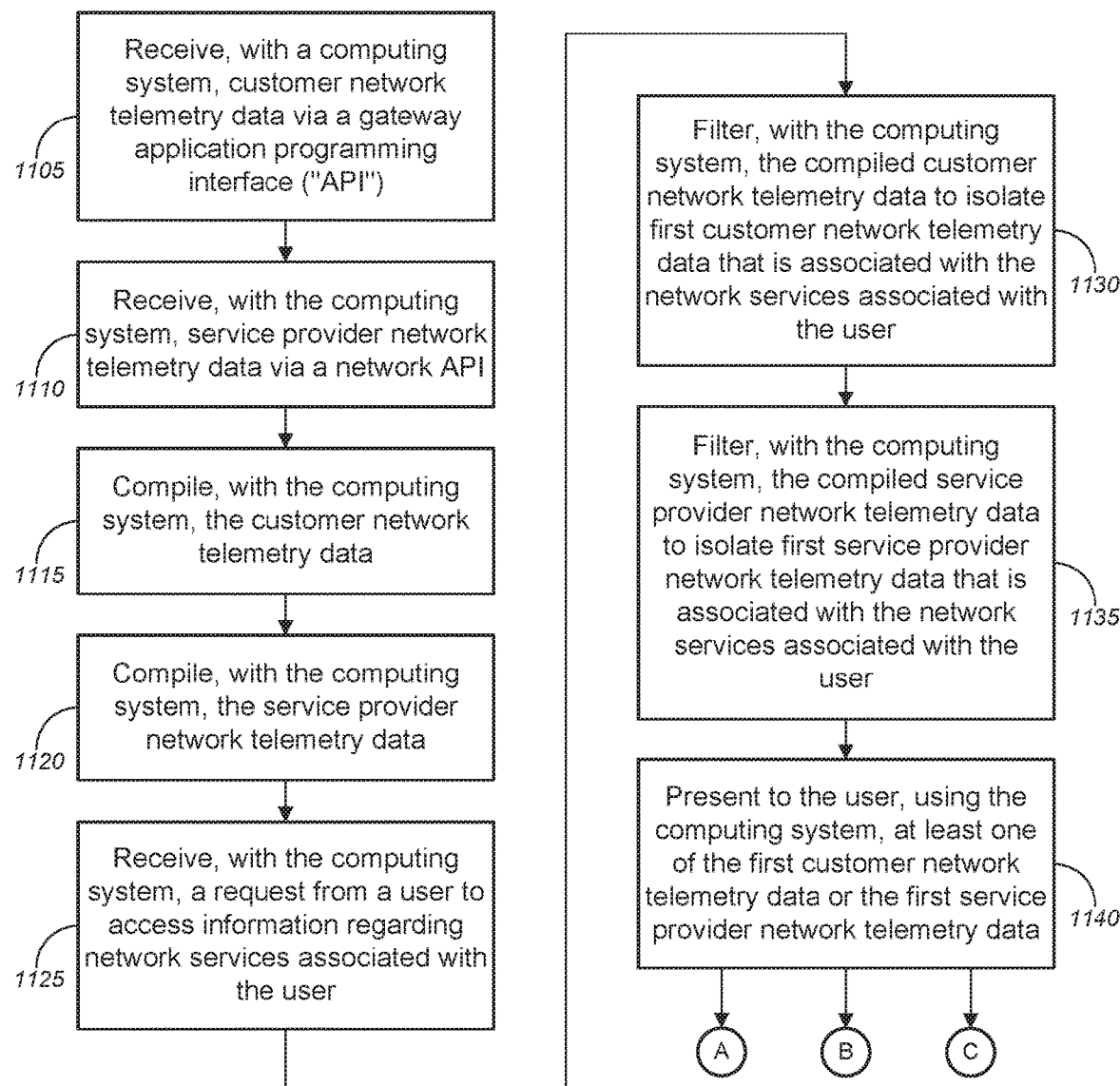

In the non-limiting embodiment of FIG. 11A, method 1100, at block 1105, might comprise receiving, with a computing system, customer network telemetry data via a gateway application programming interface ("API"). The customer network telemetry data might comprise information regarding a local area network ("LAN") associated with one or more user devices and information regarding a gateway device that connects the one or more user devices to one or more service provider networks (e.g., a core network of a service provider, other service provider network(s), or the like). In some embodiments, the computing system might include, without limitation, at least one of an API gateway, a network gateway, an access provider telemetry gateway, a residential gateway ("RG"), a business gateway ("BG"), a virtual gateway ("vG"), a network interface device ("NID"), at least one of the one or more user devices, a third party computing system, a customer computing system, an internal network-to-network interface ("INNI") system, an external network-to-network interface ("ENNI") system, a network server, a distributed computing system, or a cloud computing system, and/or the like.

According to some embodiments, the gateway device might include, but is not limited to, at least one of an API gateway, a network gateway, an access provider telemetry gateway, a residential gateway ("RG"), a business gateway ("BG"), a virtual gateway ("vG"), or a network interface device ("NID"), and/or the like.

At block 1110, method 1100 might comprise receiving, with the computing system, service provider network telemetry data via a network API. The service provider network telemetry data might comprise information regarding the one or more service provider networks and information regarding at least one network equipment in each of the one or more service provider networks. In some instances, the information regarding the one or more service provider networks and information regarding at least one network equipment in each of the one or more service provider networks might include, without limitation, at least one of telemetry data regarding one or more communications links between the one or more user devices and the gateway device, telemetry data regarding one or more communications links between the gateway device and an edge router disposed between an access network and the core network, telemetry data regarding network equipment connected by the one or more communications links between the gateway device and the edge router, telemetry data regarding the edge router, telemetry data regarding one or more communications links between the gateway device and one or more network elements disposed in the access network, telemetry data regarding network equipment connected by the one or more communications links between the gateway device and the one or more network elements, telemetry data regarding the one or more network elements, telemetry data regarding one or more communications links in a wide area network ("WAN"), telemetry data regarding network elements in the WAN connected by the one or more communications links in one or more networks (e.g., WAN or other network, or the like), telemetry data regarding one or more communications links on a communications path between one or more devices in the LAN and one or more network nodes in the WAN obtainable via the gateway device, telemetry data regarding one or more communications links on a communications path between one or more devices in the LAN and one or more network nodes in the WAN obtainable via the gateway device, or end-to-end ("E2E") telemetry data regarding one or more communications links between the one or more user devices and the core network via the gateway device, and/or the like.

In some embodiments, the customer network telemetry data and the service provider network telemetry data might each include, without limitation, at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices, and/or the like.

According to some embodiments, at least one of the gateway device or the one or more first nodes in LAN might identify one or more first shared objects in the LAN and might broadcast to other nodes an indication that the one or more first shared objects are available to be shared. The one or more first shared objects might each be an abstraction of at least one of information or one or more resources that exist in the LAN. The one or more resources might comprise at least one of physical network resources, logical network resources, virtual resources, or application layer resources, and/or the like.

In some embodiments, at least one of the one or more second nodes might identify one or more second shared objects along the one or more communications links and might broadcast to other nodes an indication that the one or more second shared objects are available to be shared. The one or more second shared objects might each be an abstraction of at least one of information or one or more resources that exist along the one or more communications links. The one or more resources might comprise at least one of physical network resources, logical network resources, virtual resources, or application layer resources, and/or the like.

Method 1100 might further comprise compiling, with the computing system, the customer network telemetry data (block 1115), compiling, with the computing system, the service provider network telemetry data (block 1120), and receiving, with the computing system, a request from a user to access information regarding network services associated with the user (block 1125).

In response to receiving the request from the user, method 1100 might comprise, at block 1130, filtering, with the computing system, the compiled customer network telemetry data to isolate first customer network telemetry data that is associated with the network services associated with the user, and, at block 1135, filtering, with the computing system, the compiled service provider network telemetry data to isolate first service provider network telemetry data that is associated with the network services associated with the user.

At block 1140, method 1100 might comprise presenting to the user, using the computing system, at least one of the first customer network telemetry data or the first service provider network telemetry data. The process at block 1140 might continue onto FIGS. 11D, 11E, and 11F, following circular markers denoted, "A," "B," and "C," respectively.

Figure 11B:
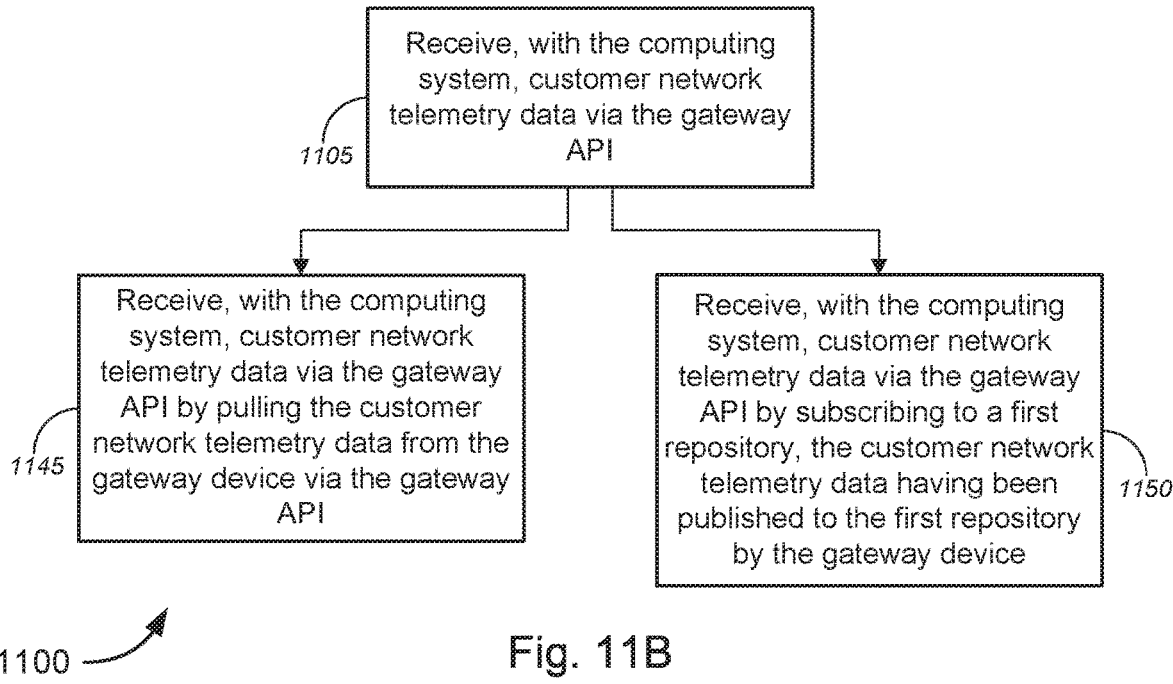

With reference to FIG. 11B, receiving, with the computing system, customer network telemetry data via the gateway API (at block 1105) might comprise either receiving, with the computing system, customer network telemetry data via the gateway API by pulling the customer network telemetry data from the gateway device via the gateway API (block 1145) and/or receiving, with the computing system, customer network telemetry data via the gateway API by subscribing to a first repository, the customer network telemetry data having been published to the first repository by the gateway device (block 1150).

Figure 11C:
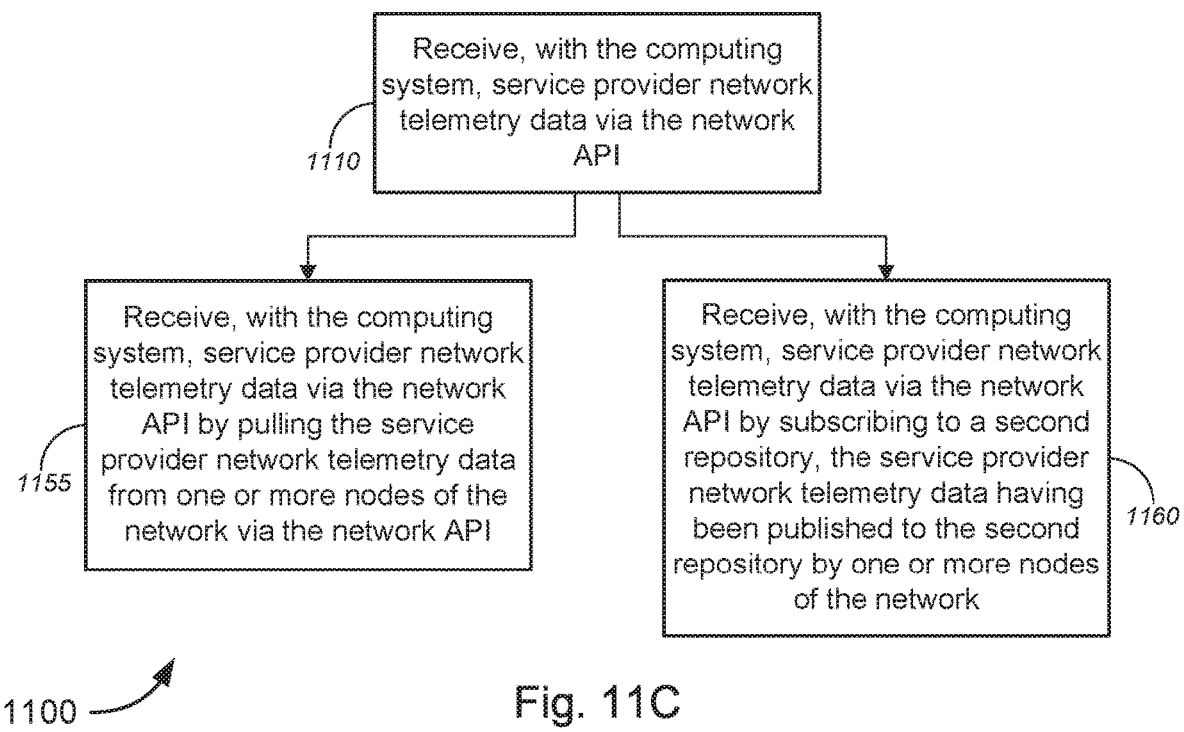

Turning to FIG. 11C, receiving, with the computing system, service provider network telemetry data via the network API (at block 1110) might comprise either receiving, with the computing system, service provider network telemetry data via the network API by pulling the service provider network telemetry data from one or more nodes of the network via the network API (block 1155) and/or receiving, with the computing system, service provider network telemetry data via the network API by subscribing to a second repository, the service provider network telemetry data having been published to the second repository by one or more nodes of the network (block 1160). In some cases, the first repository and the second repository are the same repository.

In FIG. 11D, following circular marker, "A," from block 1140, method 1100 might comprise receiving, with at least one of the computing system or the gateway device, a request from a user to use network functions virtualization infrastructure ("NFVI") resources capable of supporting a VNF that is configured to collect, generate, and provide telemetry information (block 1165) and identifying, with the at least one of the computing system or the gateway device, which of at least one of the one or more first nodes or the one or more second nodes is able to handle the request (block 1170). In some embodiments, identifying which of at least one of the one or more first nodes or the one or more second nodes is able to handle the request might comprise using a registry of shared objects to identify the requested NFVI resources and to identify the network equipment hosting the NFVI resources (block 1175). The shared objects are each an abstraction of at least one of information or one or more resources that exist in at least one of the LAN or the one or more networks along the one or more communications links. Method 1100 might further comprise, at block 1180, redirecting, with the at least one of the computing system or the gateway device, the request to the identified at least one of the one or more first nodes or the one or more second nodes to provide the user with access to the NFVI resources.

In FIG. 11E, following circular marker, "B," from block 1140, method 1100 might comprise providing, with a user interface, information regarding shared objects that are available for use by the user (block 1185) and providing, with the user interface, the user with access control to the shared objects (block 1190). In some embodiments, the user interface might include, without limitation, at least one of a customer web portal, a software application ("app") user interface, or a dedicated customer API user interface, and/or the like. The shared objects, according to some embodiments, might each be an abstraction of at least one of information or one or more resources that exist in at least one of the LAN, the WAN, or one or more networks along the one or more communications links, and/or the like.

In FIG. 11F, following circular marker, "C," from block 1140, method 1100 might comprise presenting to the user, using the computing system, at least one of the first customer network telemetry data or the first service provider network telemetry data via a user interface (block 1140') and providing the user with control of one or more available network resources, via the user interface (block 1195). In some embodiments, the user interface might include, without limitation, at least one of a customer web portal, a software application ("app") user interface, or a dedicated customer API user interface, and/or the like. The shared objects, according to some embodiments, might each be an abstraction of at least one of information or one or more resources that exist in at least one of the LAN, the WAN, or one or more networks along the one or more communications links, and/or the like.

Exemplary System and Hardware Implementation

Figure 12:
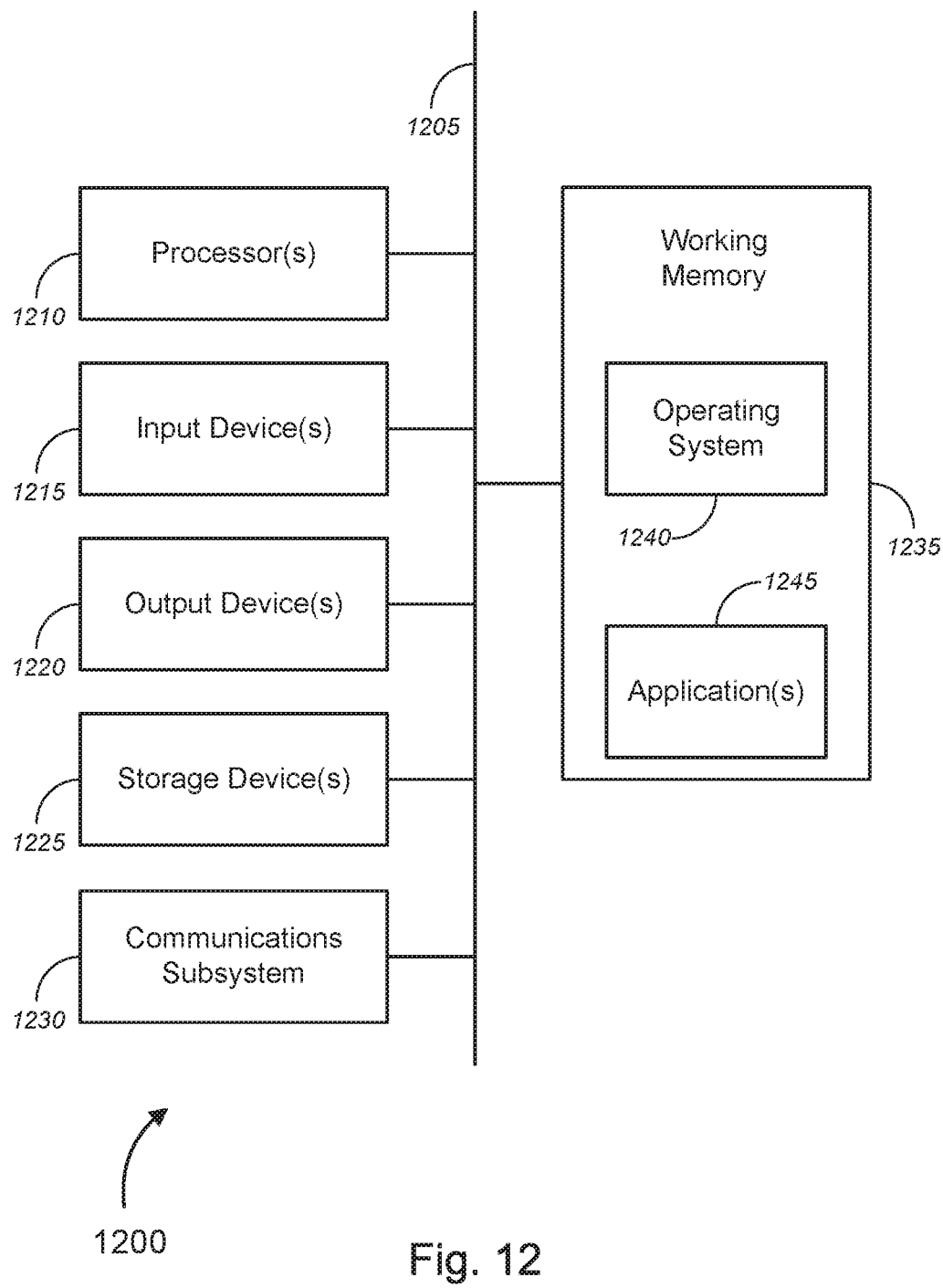
FIG. 12 is a block diagram illustrating an exemplary computer or system hardware architecture, in accordance with various embodiments.

FIG. 12 is a block diagram illustrating an exemplary computer or system hardware architecture, in accordance with various embodiments. FIG. 12 provides a schematic illustration of one embodiment of a computer system 1200 of the service provider system hardware that can perform the methods provided by various other embodiments, as described herein, and/or can perform the functions of computer or hardware system (i.e., gateway devices 105, 205, 210, 305, 605, 755, and 785, user devices/systems 110*a*-110*n*, 350, and 745, nodes 115*a*-115*n* and 130, computing systems 135*a*, 145*a*, and 155*a*, servers 335 and 435, compute systems 340 and 345, telemetry controller 405, NID telemetry collector 430, provider infrastructure 615, gateway controller 750, OTT or centralized system 760, central system 765, voice control system 770, management agent 775, service provider orchestrator 780, etc.), as described above. It should be noted that FIG. 12 is meant only to provide a generalized illustration of various components, of which one or more (or none) of each may be utilized as appropriate. FIG. 12, therefore, broadly illustrates how individual system elements may be implemented in a relatively separated or relatively more integrated manner.

The computer or hardware system 1200—which might represent an embodiment of the computer or hardware system (i.e., gateway devices 105, 205, 210, 305, 605, 755, and 785, user devices/systems 110*a*-110*n*, 350, and 745, nodes 115*a*-115*n* and 130, computing systems 135*a*, 145*a*, and 155*a*, servers 335 and 435, compute systems 340 and 345, telemetry controller 405, NID telemetry collector 430, provider infrastructure 615, gateway controller 750, OTT or centralized system 760, central system 765, voice control system 770, management agent 775, service provider orchestrator 780, etc.), as described above with respect to FIGS. 1-11—is shown comprising hardware elements that can be electrically coupled via a bus 1205 (or may otherwise be in communication, as appropriate). The hardware elements may include one or more processors 1210, including, without limitation, one or more general-purpose processors and/or one or more special-purpose processors (such as microprocessors, digital signal processing chips, graphics acceleration processors, and/or the like); one or more input devices 1215, which can include, without limitation, a mouse, a keyboard and/or the like; and one or more output devices 1220, which can include, without limitation, a display device, a printer, and/or the like.

The computer or hardware system 1200 may further include (and/or be in communication with) one or more storage devices 1225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 1200 might also include a communications subsystem 1230, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1230 may permit data to be exchanged with a network (such as the network described below, to name one example), with other computer or hardware systems, and/or with any other devices described herein. In many embodiments, the computer or hardware system 1200 will further comprise a working memory 1235, which can include a RAM or ROM device, as described above.

The computer or hardware system 1200 also may comprise software elements, shown as being currently located within the working memory 1235, including an operating system 1240, device drivers, executable libraries, and/or other code, such as one or more application programs 1245, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1225 described above. In some cases, the storage medium might be incorporated within a computer system, such as the system 1200. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 1200 and/or might take the form of source and/or installable code, which, upon compilation and/or installation on the computer or hardware system 1200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1200) to perform methods in accordance with various embodiments of the invention. According to a set of embodiments, some or all of the procedures of such methods are performed by the computer or hardware system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer readable medium, such as one or more of the storage device(s) 1225. Merely by way of example, execution of the sequences of instructions contained in the working memory 1235 might cause the processor(s) 1210 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1200, various computer readable media might be involved in providing instructions/code to processor(s) 1210 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1225. Volatile media includes, without limitation, dynamic memory, such as the working memory 1235. In some alternative embodiments, a computer readable medium may take the form of transmission media, which includes, without limitation, coaxial cables, copper wire and fiber optics, including the wires that comprise the bus 1205, as well as the various components of the communication subsystem 1230 (and/or the media by which the communications subsystem 1230 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1200. These signals, which might be in the form of electromagnetic signals, acoustic signals, optical signals, and/or the like, are all examples of carrier waves on which instructions can be encoded, in accordance with various embodiments of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a storage device 1225 either before or after execution by the processor(s) 1210.

Figure 13:
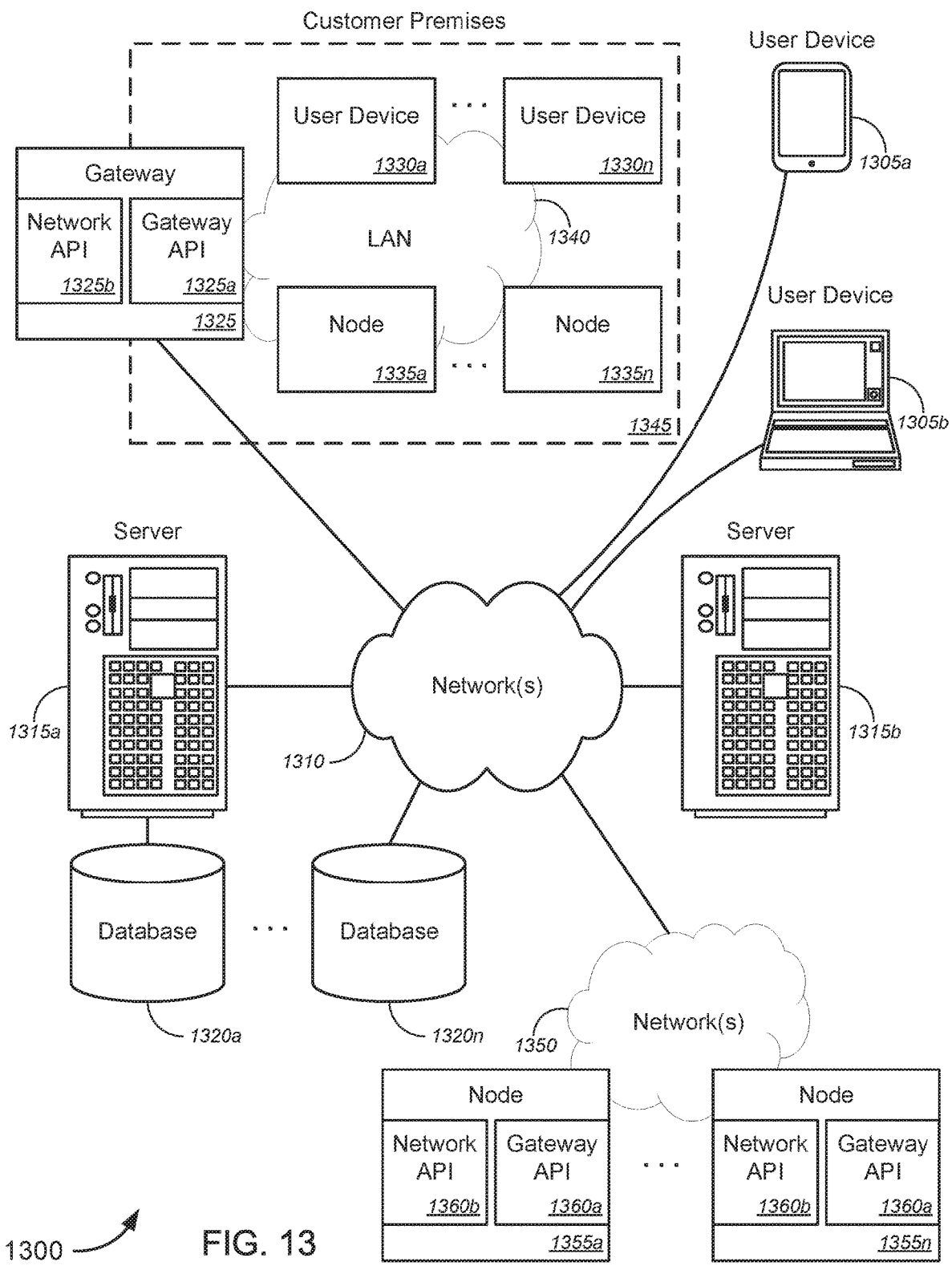
FIG. 13 is a block diagram illustrating a networked system of computers, computing systems, or system hardware architecture, which can be used in accordance with various embodiments.

As noted above, a set of embodiments comprises methods and systems for implementing network application programming interface ("API"), and, more particularly, to methods, systems, and apparatuses for implementing API and/or server or gateway function to provide network metrics to users. FIG. 13 illustrates a schematic diagram of a system 1300 that can be used in accordance with one set of embodiments. The system 1300 can include one or more user computers, user devices, or customer devices 1305. A user computer, user device, or customer device 1305 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1305 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1305 can be any other electronic device, such as a thin-client computer, Internet-enabled mobile telephone, and/or personal digital assistant, capable of communicating via a network (e.g., the network(s) 1310 described below) and/or of displaying and navigating web pages or other types of electronic documents. Although the exemplary system 1300 is shown with two user computers, user devices, or customer devices 1305, any number of user computers, user devices, or customer devices can be supported.

Certain embodiments operate in a networked environment, which can include a network(s) 1310. The network(s) 1310 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1310 (similar to network(s) 120, 135, 140, 145, 220, 230, 240, 250, 325, 330, 630, 635, and 640 of FIGS. 1, 2, 3, and 6, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1315. Each of the server computers 1315 may be configured with an operating system, including, without limitation, any of those discussed above, as well as any commercially (or freely) available server operating systems. Each of the servers 1315 may also be running one or more applications, which can be configured to provide services to one or more clients 1305 and/or other servers 1315.

Merely by way of example, one of the servers 1315 might be a data server, a web server, a cloud computing device(s), or the like, as described above. The data server might include (or be in communication with) a web server, which can be used, merely by way of example, to process requests for web pages or other electronic documents from user computers 1305. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1305 to perform methods of the invention.

The server computers 1315, in some embodiments, might include one or more application servers, which can be configured with one or more applications accessible by a client running on one or more of the client computers 1305 and/or other servers 1315. Merely by way of example, the server(s) 1315 can be one or more general purpose computers capable of executing programs or scripts in response to the user computers 1305 and/or other servers 1315, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1305 and/or another server 1315. In some embodiments, an application server can perform one or more of the processes for implementing network application programming interface ("API"), and, more particularly, to methods, systems, and apparatuses for implementing API and/or server or gateway function to provide network metrics to users, as described in detail above. Data provided by an application server may be formatted as one or more web pages (comprising HTML, JavaScript, etc., for example) and/or may be forwarded to a user computer 1305 via a web server (as described above, for example). Similarly, a web server might receive web page requests and/or input data from a user computer 1305 and/or forward the web page requests and/or input data to an application server. In some cases, a web server may be integrated with an application server.

In accordance with further embodiments, one or more servers 1315 can function as a file server and/or can include one or more of the files (e.g., application code, data files, etc.) necessary to implement various disclosed methods, incorporated by an application running on a user computer 1305 and/or another server 1315. Alternatively, as those skilled in the art will appreciate, a file server can include all necessary files, allowing such an application to be invoked remotely by a user computer, user device, or customer device 1305 and/or server 1315.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1320a-1320n (collectively, "databases 1320"). The location of each of the databases 1320 is discretionary: merely by way of example, a database 1320a might reside on a storage medium local to (and/or resident in) a server 1315a (and/or a user computer, user device, or customer device 1305). Alternatively, a database 1320n can be remote from any or all of the computers 1305, 1315, so long as it can be in communication (e.g., via the network 1310) with one or more of these. In a particular set of embodiments, a database 1320 can reside in a storage-area network ("SAN") familiar to those skilled in the art. (Likewise, any necessary files for performing the functions attributed to the computers 1305, 1315 can be stored locally on the respective computer and/or remotely, as appropriate.) In one set of embodiments, the database 1320 can be a relational database, such as an Oracle database, that is adapted to store, update, and retrieve data in response to SQL-formatted commands. The database might be controlled and/or maintained by a database server, as described above, for example.

According to some embodiments, system 1300 might further comprise gateway device 1325 (similar to gateway devices 105, 205, 210, 305, 605, 755, and 785 of FIGS. 1, 2, 3, 6, and 7, or the like), one or more user devices 1330a-1330n (similar to user devices/systems 110a-110n, 345, and 745 of FIGS. 1, 3, and 7, respectively, or the like), one or more first nodes 1335a-1335n (similar to nodes 115a-115n of FIG. 1, or the like), and local area network ("LAN") 1340 (similar to LAN 120, 220, 330, and 630, of FIGS. 1, 2, 3, and 6, respectively, or the like), each of which are located at customer premises 1345 (similar to customer premises 125 of FIG. 1, or the like). System 1300 might further comprise network(s) 1350 (similar to network(s) 140, 150, 160, 230, 240, 250, and 325 of FIGS. 1, 2, and 3, of the like) and one or more second nodes 1355a-1355n (similar to nodes 130 of FIG. 1, or the like) disposed in network 1350. Gateway application programming interface ("API") 1325a (similar to gateway API 105a and 705 of FIGS. 1 and 7, respectively, or the like) and network API 1325b (similar to network API 105b or 705 of FIGS. 1 and 7, respectively, or the like) may be disposed within gateway 1325, while gateway API 1360a (similar to gateway API 130a and 705 of FIGS. 1 and 7, respectively, or the like) and network API 1060n (similar to network API 130b and 705 of FIGS. 1 and 7, respectively, or the like) may be disposed within each of second nodes 1355a-1355n, respectively. Although not shown, each of at least one of first nodes 1335a-1335n might comprise a gateway API (like gateway API 1325a or the like) and a network API (like network API 1325b or the like).

In operation, a computing system (which might be embodied by server(s) 1315, gateway 1325, first node(s) 1335, or second node(s) 1355, and/or the like) might receive customer network telemetry data of LAN 1340 via a gateway API 1325a or 1360a, might receive service provider network telemetry data via a network API 1325b or 1360b, and might compile the customer network telemetry data, might compile the service provider network telemetry data, and might receive a request from a user to access information regarding network services associated with the user. In response to receiving the request from the user, the computing system might filter the compiled customer network telemetry data to isolate first customer network telemetry data that is associated with the network services associated with the user and might filter the compiled service provider network telemetry data to isolate first service provider network telemetry data that is associated with the network services associated with the user. The computing system might subsequently provide the user with access to at least one of the first customer network telemetry data or the first service provider network telemetry data, and might provide the user with options to control network resources.

These and other functions of the system 1300 (and its components) are described in greater detail above with respect to FIGS. 1-11.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a computing system, customer network telemetry data via a gateway application programming interface ("API"), the customer network telemetry data comprising information regarding a local area network ("LAN") associated with one or more user devices and information regarding a gateway device that connects the one or more user devices to one or more service provider networks;
receiving, with the computing system, service provider network telemetry data via a network API, the service provider network telemetry data comprising information regarding the one or more service provider networks and information regarding at least one network equipment in each of the one or more service provider networks;
compiling, with the computing system, the customer network telemetry data;
compiling, with the computing system, the service provider network telemetry data;
receiving, with the computing system, a request from a user to access information regarding network services associated with the user;
in response to receiving the request from the user, filtering, with the computing system, the compiled customer network telemetry data to isolate first customer network telemetry data that is associated with the network services associated with the user, and filtering, with the computing system, the compiled service provider network telemetry data to isolate first service provider network telemetry data that is associated with the network services associated with the user; and presenting to the user, using the computing system, at least one of the first customer network telemetry data or the first service provider network telemetry data;

wherein receiving the customer network telemetry data via the gateway API comprises receiving, with the computing system, customer network telemetry data via the gateway API by pulling the customer network telemetry data from one or more first nodes of the LAN via the gateway API, and wherein receiving the service provider network telemetry data via the network API comprises receiving, with the computing system, service provider network telemetry data via the network API by pulling the service provider network telemetry data from one or more second nodes of each of the one or more service provider networks via the network API.

2. The method of claim 1, wherein the computing system comprises at least one of an API gateway, a network gateway, an access provider telemetry gateway, a residential gateway ("RG"), a business gateway ("BG"), a virtual gateway ("vG"), a network interface device ("NID"), at least one of the one or more user devices, a third party computing system, a customer computing system, an internal network-to-network interface ("INNI") system, an external network-to-network interface ("ENNI") system, a network server, a distributed computing system, or a cloud computing system.

3. The method of claim 1, wherein the gateway device comprises at least one of an API gateway, a network gateway, an access provider telemetry gateway, a residential gateway ("RG"), a business gateway ("BG"), a virtual gateway ("vG"), or a network interface device ("NID").

4. The method of claim 1, wherein the information regarding one or more communications links in the one or more service provider networks and the information regarding at least one network equipment in each of the one or more service provider networks comprise at least one of telemetry data regarding one or more communications links between the one or more user devices and the gateway device, telemetry data regarding one or more communications links between the gateway device and an edge router disposed between an access network and the core network, telemetry data regarding network equipment connected by the one or more communications links between the gateway device and the edge router, telemetry data regarding the edge router, telemetry data regarding one or more communications links between the gateway device and one or more network elements disposed in the access network, telemetry data regarding network equipment connected by the one or more communications links between the gateway device and the one or more network elements, telemetry data regarding the one or more network elements, telemetry data regarding one or more communications links in a wide area network ("WAN"), telemetry data regarding network elements in the WAN connected by the one or more communications links in the WAN, telemetry data regarding one or more communications links on a communications path between one or more devices in the LAN and one or more network nodes in the WAN obtainable via the gateway device, telemetry data regarding one or more communications links on a communications path between one or more devices in the LAN and one or more network nodes in the WAN obtainable via the gateway device, or end-to-end ("E2E") telemetry data regarding one or more communications links between the one or more user devices and the core network via the gateway device.

5. The method of claim 1, wherein the customer network telemetry data are published to a first repository by at least one first node of the one or more first nodes in the LAN, wherein the service provider network telemetry data are published to a second repository by at least one second node of the one or more second nodes in each of the one or more service provider networks, wherein receiving the customer network telemetry data via the gateway API comprises receiving, with the computing system, customer network telemetry data via the gateway API by subscribing to the first repository, and wherein receiving the service provider network telemetry data via the network API comprises receiving, with the computing system, service provider network telemetry data via the network API by subscribing to the second repository.

6. The method of claim 5, wherein the first repository and the second repository are the same repository.

7. The method of claim 1, wherein the customer network telemetry data and the service provider network telemetry data each comprises at least one of service operations, administration, and management ("Service OAM") data, service activation testing ("SAT") data, Iperf network performance measurement and tuning data, real-time statistics data, transmitted frame information, received frame information, transmitted packet information, received packet information, information regarding a processing unit of the gateway device, information regarding processing units of each of the one or more first nodes, information regarding processing units of each of the one or more second nodes, alarm indication signal ("AIS") data, data regarding whether one or more nodes are powered, data regarding whether one or more nodes are connected, device identification information of each of one or more nodes, device capability information of each of one or more nodes, resource consumption information for each of one or more network resources, or resource consumption information by each of one or more devices.

8. The method of claim 1, wherein at least one of the gateway device or the one or more first nodes in the LAN identifies one or more first shared objects in the LAN and broadcasts to other nodes an indication that the one or more first shared objects are available to be shared, the one or more first shared objects each being an abstraction of at least one of information or one or more resources that exist in the LAN, wherein the one or more resources comprise at least one of physical network resources, logical network resources, virtual resources, or application layer resources.

9. The method of claim 1, wherein at least one of the one or more second nodes identifies one or more second shared objects in the corresponding one or more service provider networks and broadcasts to other nodes an indication that the one or more second shared objects are available to be shared, the one or more second shared objects each being an abstraction of at least one of information or one or more resources that exist in the corresponding one or more service provider networks, wherein the one or more resources comprise at least one of physical network resources, logical network resources, virtual resources, or application layer resources.

10. The method of claim 1, further comprising:

receiving, with at least one of the computing system or the gateway device, a request from a user to use network functions virtualization infrastructure ("NFVI") resources capable of supporting a VNF that is configured to collect, generate, and provide telemetry information;

identifying, with the at least one of the computing system or the gateway device, which of at least one of the one or more first nodes or the one or more second nodes is able to handle the request; and redirecting, with the at least one of the computing system or the gateway device, the request to the identified at least one of the one or more first nodes or the one or more second nodes to provide the user with access to the NFVI resources.

11. The method of claim 10, wherein identifying which of at least one of the one or more first nodes or the one or more second nodes is able to handle the request comprises using a registry of shared objects to identify the requested NFVI resources and to identify the network equipment hosting the NFVI resources, wherein the shared objects are each an abstraction of at least one of information or one or more resources that exist in at least one of the LAN or the one or more service provider networks.

12. The method of claim 1, wherein presenting to the user at least one of the first customer network telemetry data or the first service provider network telemetry data comprises presenting, with the computing system, the at least one of the first customer network telemetry data or the first service provider network telemetry data via a user interface accessible by the user, wherein the user interface comprises at least one of a customer web portal, a software application ("app") user interface, or a dedicated customer API user interface.

13. The method of claim 12, wherein the user interface provides information regarding shared objects that are available for use by the user, and provides the user with access control to the shared objects.

14. The method of claim 13, wherein the information regarding shared objects that are available for use by the user is based at least in part on information obtained from a registry of shared objects.

15. The method of claim 12, further comprising:
providing the user with control of one or more available network resources, via the user interface.

16. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive customer network telemetry data via a gateway application programming interface ("API"), the customer network telemetry data comprising information regarding a local area network ("LAN") associated with one or more user devices and information regarding a gateway device that connects the one or more user devices to one or more service provider networks;
receive service provider network telemetry data via a network API, the service provider network telemetry data comprising information regarding the one or more service provider networks and information regarding at least one network equipment in each of the one or more service provider networks;
compile the customer network telemetry data;
compile the service provider network telemetry data;
receive a request from a user to access information regarding network services associated with the user;
in response to receiving the request from the user, filter the compiled customer network telemetry data to isolate first customer network telemetry data that is associated with the network services associated with the user, and filter the compiled service provider network telemetry data to isolate first service provider network telemetry data that is associated with the network services associated with the user; and
present to the user at least one of the first customer network telemetry data or the first service provider network telemetry data;
wherein receiving the customer network telemetry data via the gateway API comprises receiving, with the computing system, customer network telemetry data via the gateway API by pulling the customer network telemetry data from one or more first nodes of the LAN via the gateway API, and wherein receiving the service provider network telemetry data via the network API comprises receiving, with the computing system, service provider network telemetry data via the network API by pulling the service provider network telemetry data from one or more second nodes of each of the one or more service provider networks via the network API.

17. The apparatus of claim 16, wherein the apparatus comprises at least one of an API gateway, a network gateway, an access provider telemetry gateway, a residential gateway ("RG"), a business gateway ("BG"), a virtual gateway ("vG"), a network interface device ("NID"), at least one of the one or more user devices, a third party computing system, a customer computing system, an internal network-to-network interface ("INNI") system, an external network-to-network interface ("ENNI") system, a network server, a distributed computing system, or a cloud computing system.

18. The apparatus of claim 16, wherein the set of instructions, when executed by the at least one processor, causes the apparatus to:
receive a request from a user to use network functions virtualization infrastructure ("NFVI") resources capable of supporting a VNF that is configured to collect, generate, and provide telemetry information;
identify which of at least one of the one or more first nodes or the one or more second nodes is able to handle the request; and
redirect the request to the identified at least one of the one or more first nodes or the one or more second nodes to provide the user with access to the NFVI resources.

19. A system, comprising:
one or more first nodes in a local area network ("LAN"), each first node comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the first node to:
obtain customer network telemetry data comprising information regarding the LAN and information regarding a gateway that connects the one or more user devices to one or more service provider networks; and
send the customer network telemetry data to a computing system via a gateway application programming interface ("API");
one or more second nodes in each of the one or more service provider networks, each second node comprising:

at least one second processor; and a second non-transitory computer readable medium communicatively coupled to the at least one second processor, the second non-transitory computer readable medium having stored thereon computer software comprising a second set of instructions that, when executed by the at least one second processor, causes the second node to:

obtain service provider network telemetry data comprising information regarding a corresponding one of the one or more service provider networks and information regarding at least one network equipment in the corresponding one of one or more service provider networks; and send the service provider network telemetry data to the computing system via a network API; and the computing system, comprising:

at least one third processor; and a third non-transitory computer readable medium communicatively coupled to the at least one third processor, the third non-transitory computer readable medium having stored thereon computer software comprising a third set of instructions that, when executed by the at least one third processor, causes the computing system to:

receive the customer network telemetry data via the gateway API;

receive the service provider network telemetry data via the network API;

compile the customer network telemetry data;

compile the service provider network telemetry data;

receive a request from a user to access information regarding network services associated with the user;

in response to receiving the request from the user, filter the compiled customer network telemetry data to isolate first customer network telemetry data that is associated with the network services associated with the user, and filter the compiled service provider network telemetry data to isolate first service provider network telemetry data that is associated with the network services associated with the user; and present to the user at least one of the first customer network telemetry data or the first service provider network telemetry data;

wherein receiving the customer network telemetry data via the gateway API comprises receiving, with the computing system, customer network telemetry data via the gateway API by pulling the customer network telemetry data from the one or more first nodes of the LAN via the gateway API, and wherein receiving the service provider network telemetry data via the network API comprises receiving, with the computing system, service provider network telemetry data via the network API by pulling the service provider network telemetry data from the one or more second nodes of each of the one or more service provider networks via the network API.

* * * * *